US012138627B2

(12) United States Patent
Takahashi et al.

(10) Patent No.: US 12,138,627 B2
(45) Date of Patent: Nov. 12, 2024

(54) MICROPARTICLE SEPARATION METHOD, MICROPARTICLE SEPARATION PROGRAM, MICROPARTICLE SEPARATION SYSTEM

(71) Applicant: Sony Corporation, Tokyo (JP)

(72) Inventors: Kazuya Takahashi, Saitama (JP); Tatsumi Ito, Kanagawa (JP); Yoichi Katsumoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1091 days.

(21) Appl. No.: 16/982,518

(22) PCT Filed: Jan. 7, 2019

(86) PCT No.: PCT/JP2019/000061
§ 371 (c)(1),
(2) Date: Sep. 18, 2020

(87) PCT Pub. No.: WO2019/187466
PCT Pub. Date: Oct. 3, 2019

(65) Prior Publication Data
US 2021/0001338 A1    Jan. 7, 2021

(30) Foreign Application Priority Data
Mar. 27, 2018 (JP) .................................. 2018-060517

(51) Int. Cl.
*B01L 3/00*    (2006.01)
*G01N 15/14*    (2006.01)
*G01N 15/149*   (2024.01)

(52) U.S. Cl.
CPC ... *B01L 3/502761* (2013.01); *B01L 3/502746* (2013.01); *G01N 15/1484* (2013.01);
(Continued)

(58) Field of Classification Search
CPC ......... B01L 3/502761; B01L 3/502746; B01L 2200/14; B01L 2200/0652;
(Continued)

(56) References Cited

U.S. PATENT DOCUMENTS 6,079,836 A * 6/2000 Burr ................... G01N 15/1404
356/73
11,254,557 B2 * 2/2022 Shimizu ..................... B81B 1/00
(Continued)

FOREIGN PATENT DOCUMENTS

JP    2011237201 A * 11/2011 ............ B01L 3/0268
JP    2012127922 A *  7/2012 ........ B01L 3/502761
(Continued)

OTHER PUBLICATIONS

International Preliminary Report on Patentability mailed Oct. 8, 2020 in connection with International Application No. PCT/JP2019/000061.
(Continued)

*Primary Examiner* — Terrell H Matthews
(74) *Attorney, Agent, or Firm* — Wolf, Greenfield & Sacks, P.C.

(57) ABSTRACT

A method of extracting microparticles by detecting target microparticles for extraction in a main flow path which communicates with a pressure chamber, generating for each of the detected target microparticles a change in a negative pressure in the pressure chamber communicating with the main flow path to separate and extract each of the detected target microparticles flowing in the main flow path into the pressure chamber, wherein generating the change of the negative pressure to extract the detected target microparticles comprises generating a negative change in pressure by a different amount in accordance with a separation between the detected target microparticles.

20 Claims, 32 Drawing Sheets

(52) U.S. Cl.
CPC ... *B01L 2200/0652* (2013.01); *B01L 2200/14* (2013.01); *B01L 2300/0816* (2013.01); *B01L 2300/0864* (2013.01); *B01L 2400/049* (2013.01); *G01N 15/149* (2024.01)

(58) Field of Classification Search
CPC ..... B01L 2300/0816; B01L 2300/0864; B01L 2400/049; G01N 15/1484; G01N 15/149
USPC .......................................................... 209/12.1
See application file for complete search history.

(56) References Cited

U.S. PATENT DOCUMENTS

| | | | | |
|---|---|---|---|---|
| 2012/0078531 | A1* | 3/2012 | Lo | G01N 15/1434 702/21 |
| 2014/0027356 | A1* | 1/2014 | Ito | G01N 15/1484 209/577 |
| 2015/0204774 | A1 | 7/2015 | Ito | |
| 2019/0144262 | A1* | 5/2019 | Shimizu | B81B 1/00 204/452 |
| 2020/0072732 | A1* | 3/2020 | Hashimoto | B01L 3/502761 |

FOREIGN PATENT DOCUMENTS

| | | | |
|---|---|---|---|
| JP | 2014-036604 A | 2/2014 | |
| JP | 2014030534 | 2/2014 | |
| JP | 2016-057309 A | 4/2016 | |
| JP | 2017-058375 A | 3/2017 | |
| WO | WO-2014013802 A1 * | 1/2014 | .......... B01L 3/50273 |

OTHER PUBLICATIONS

International Search Report and Written Opinion mailed Mar. 14, 2019 in connection with International Application No. PCT/JP2019/000061.

* cited by examiner

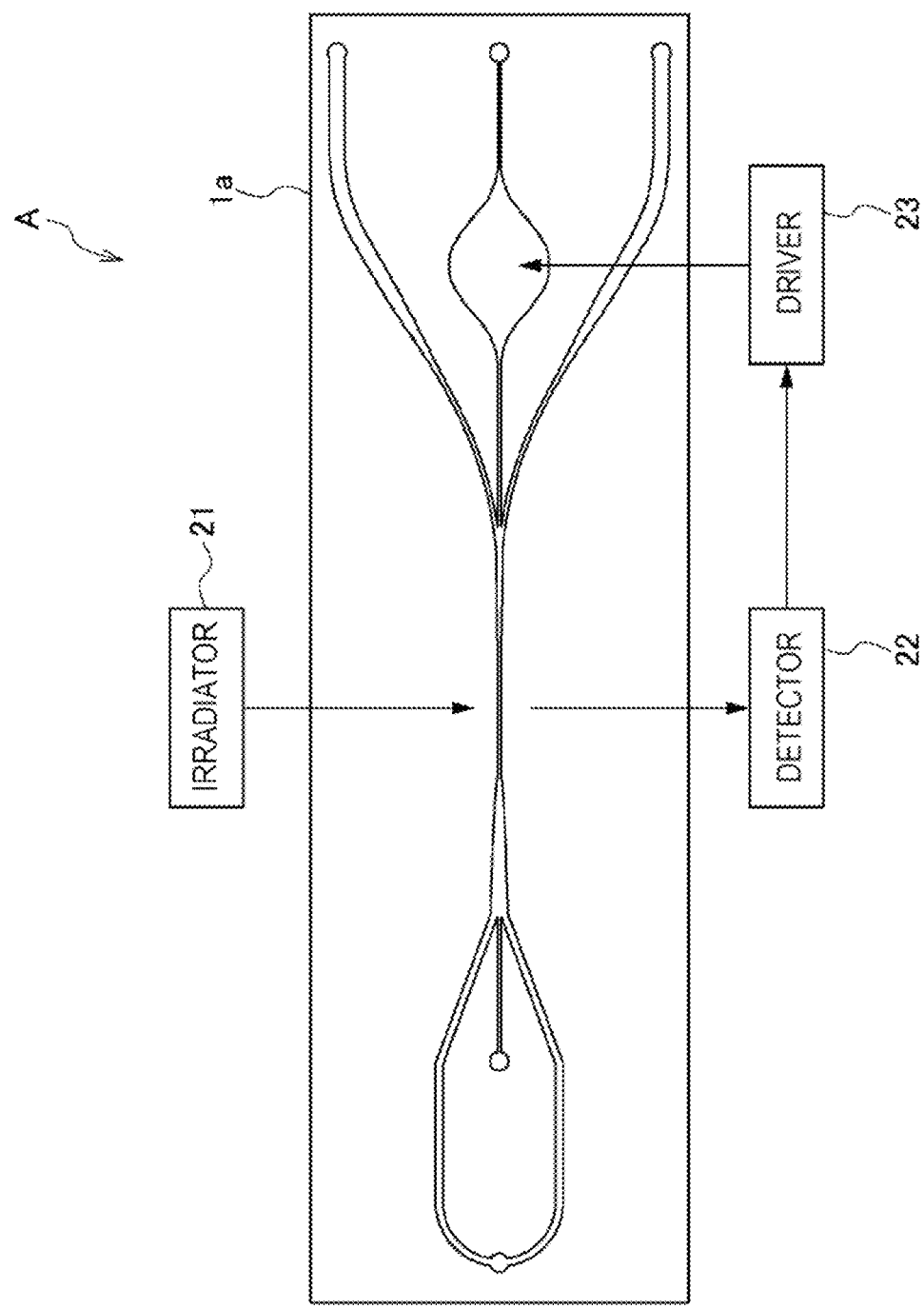
[Fig. 1]

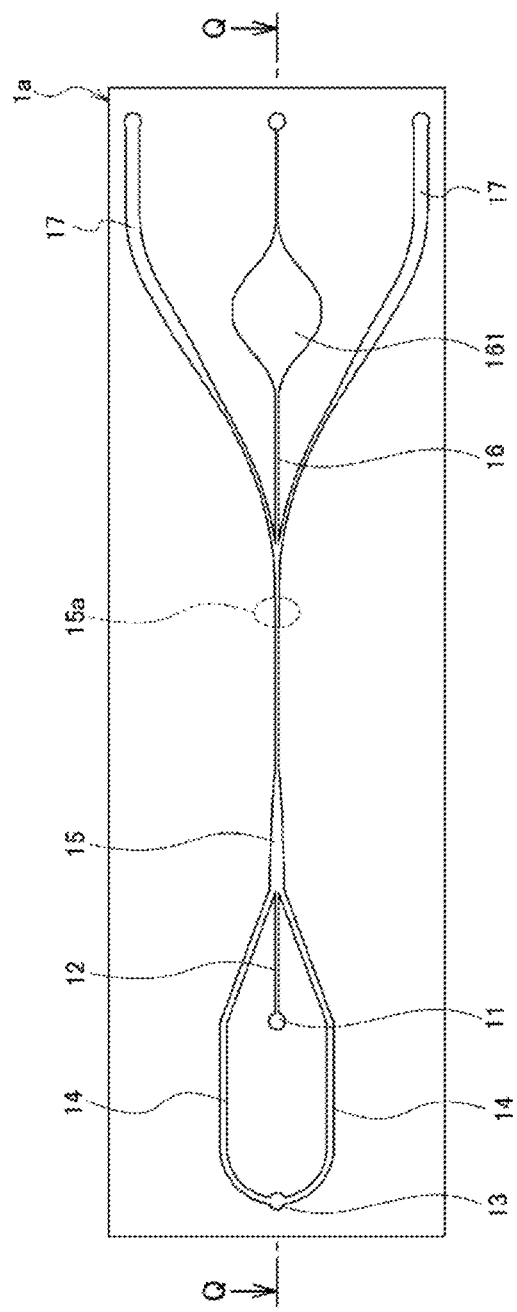
[Fig. 2]

[Fig. 3]
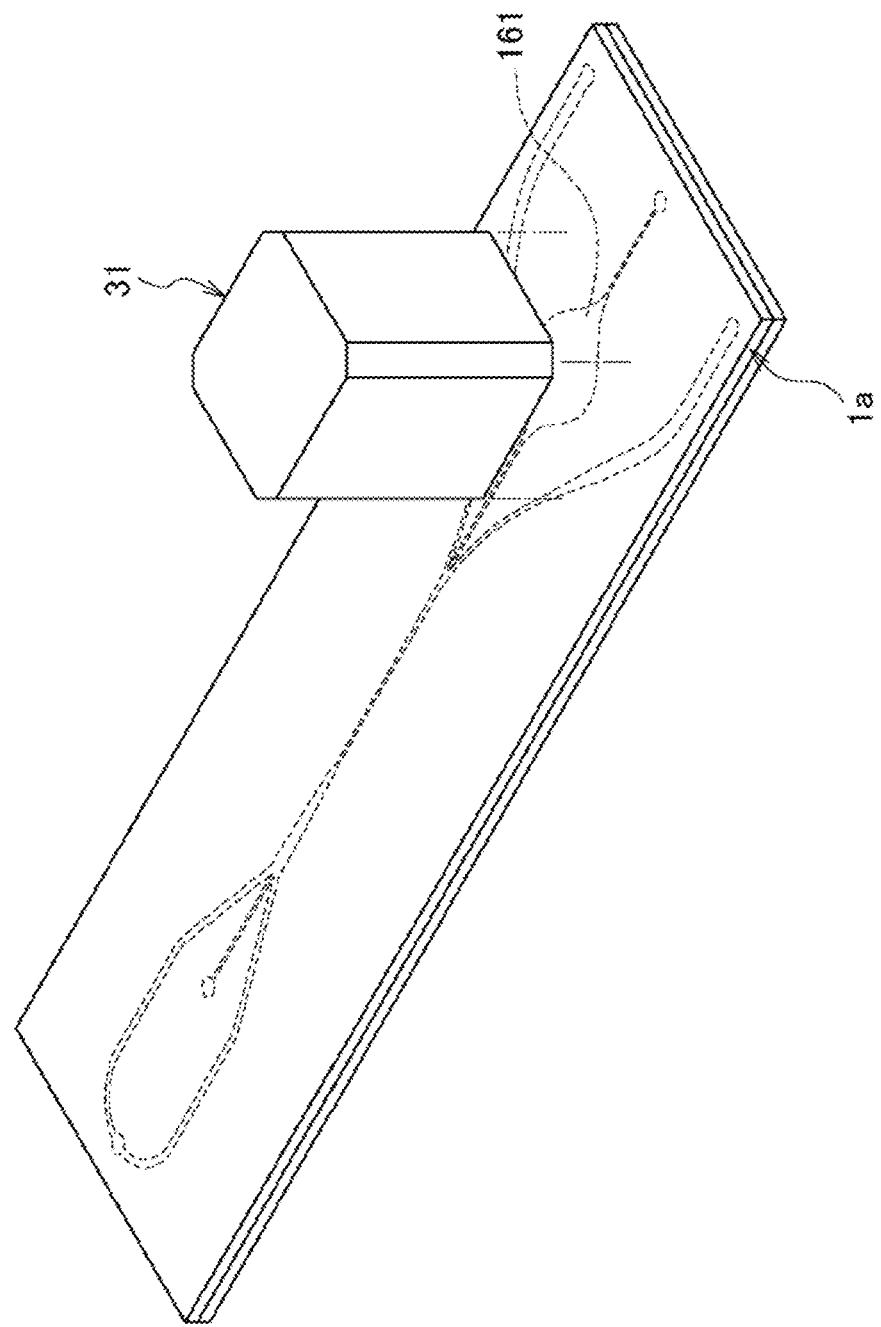

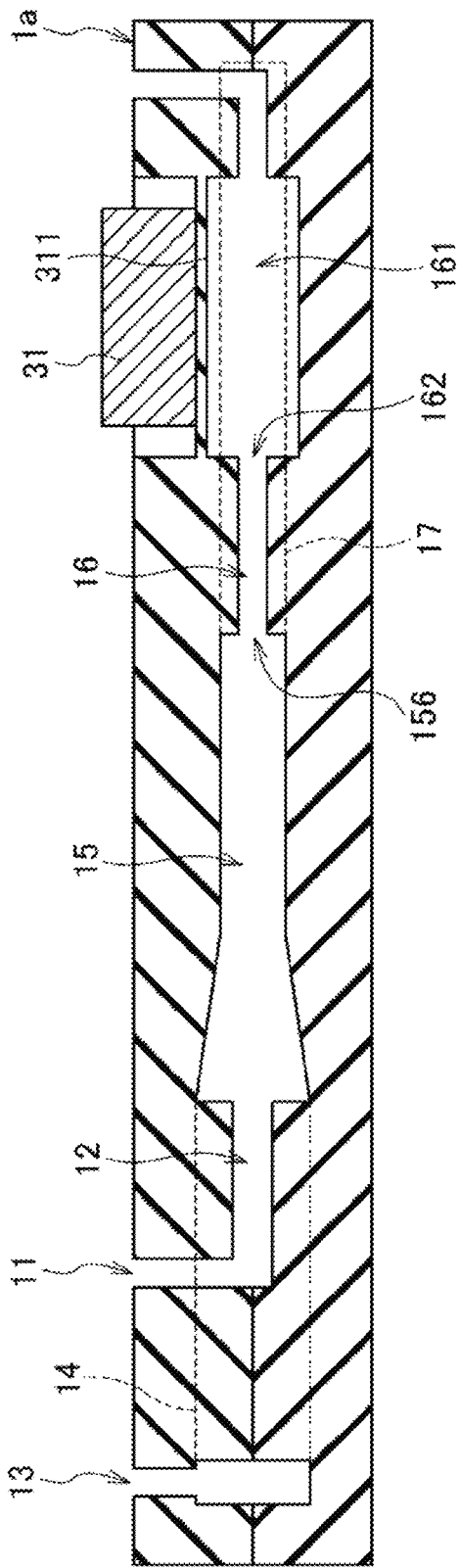

[Fig. 5A]
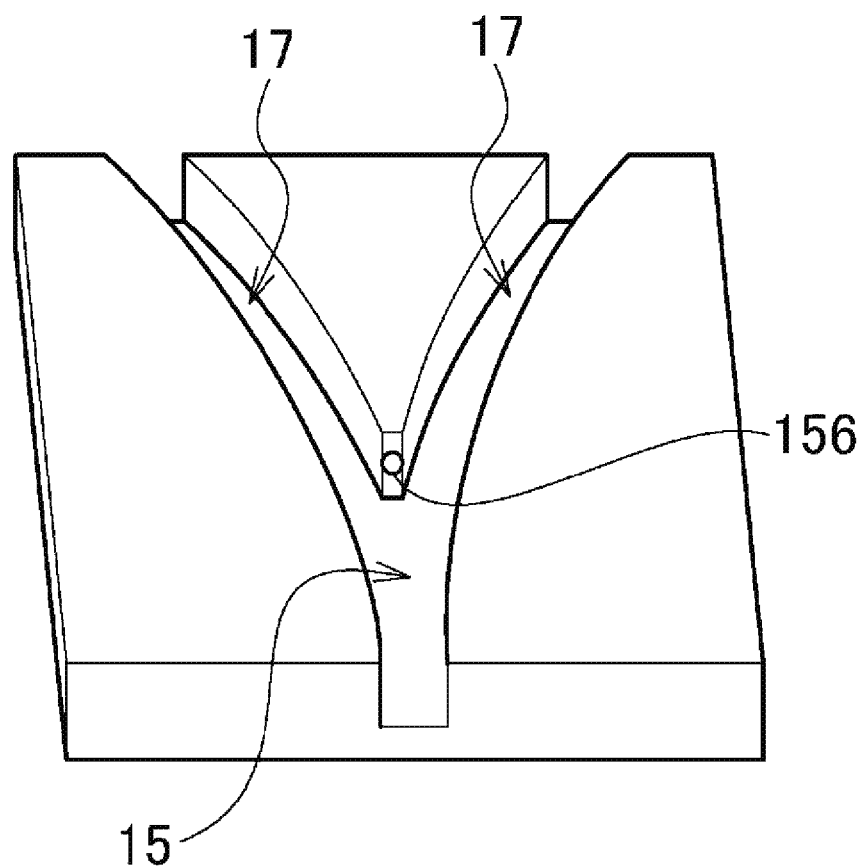

[Fig. 5B]
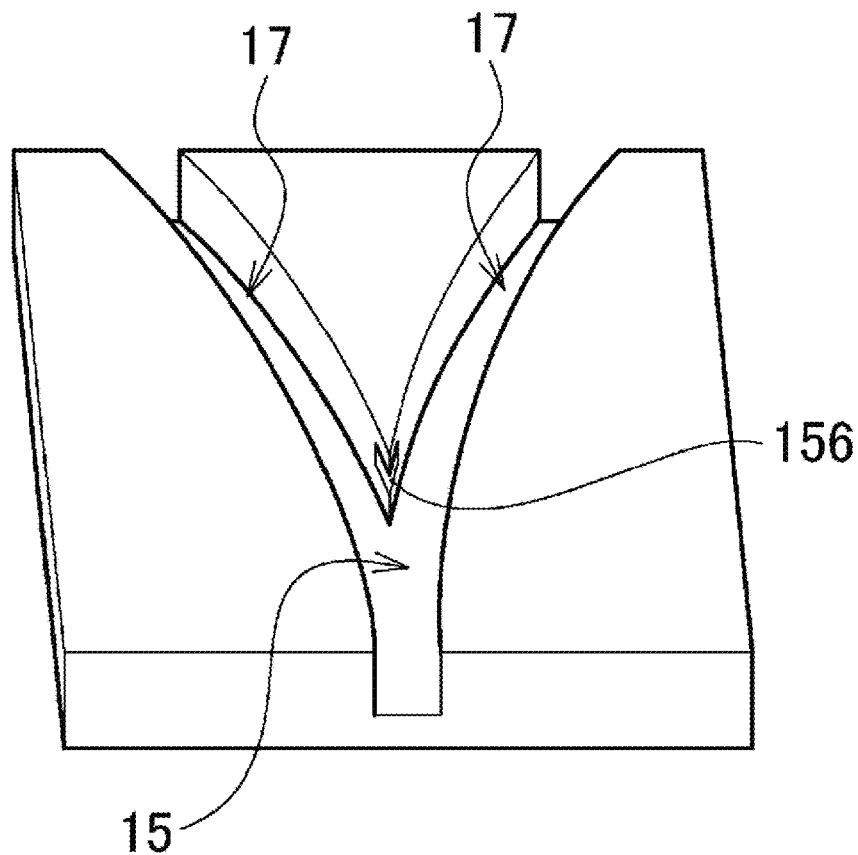
[Fig. 5C]
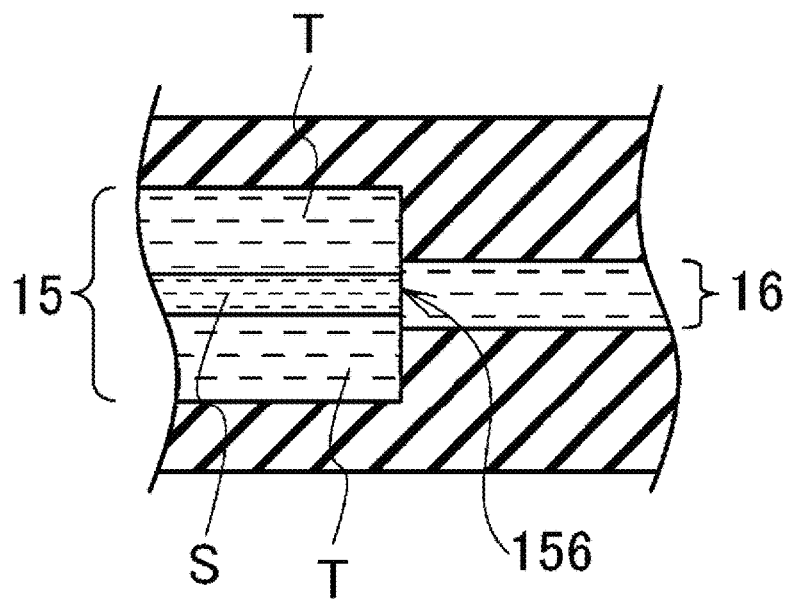

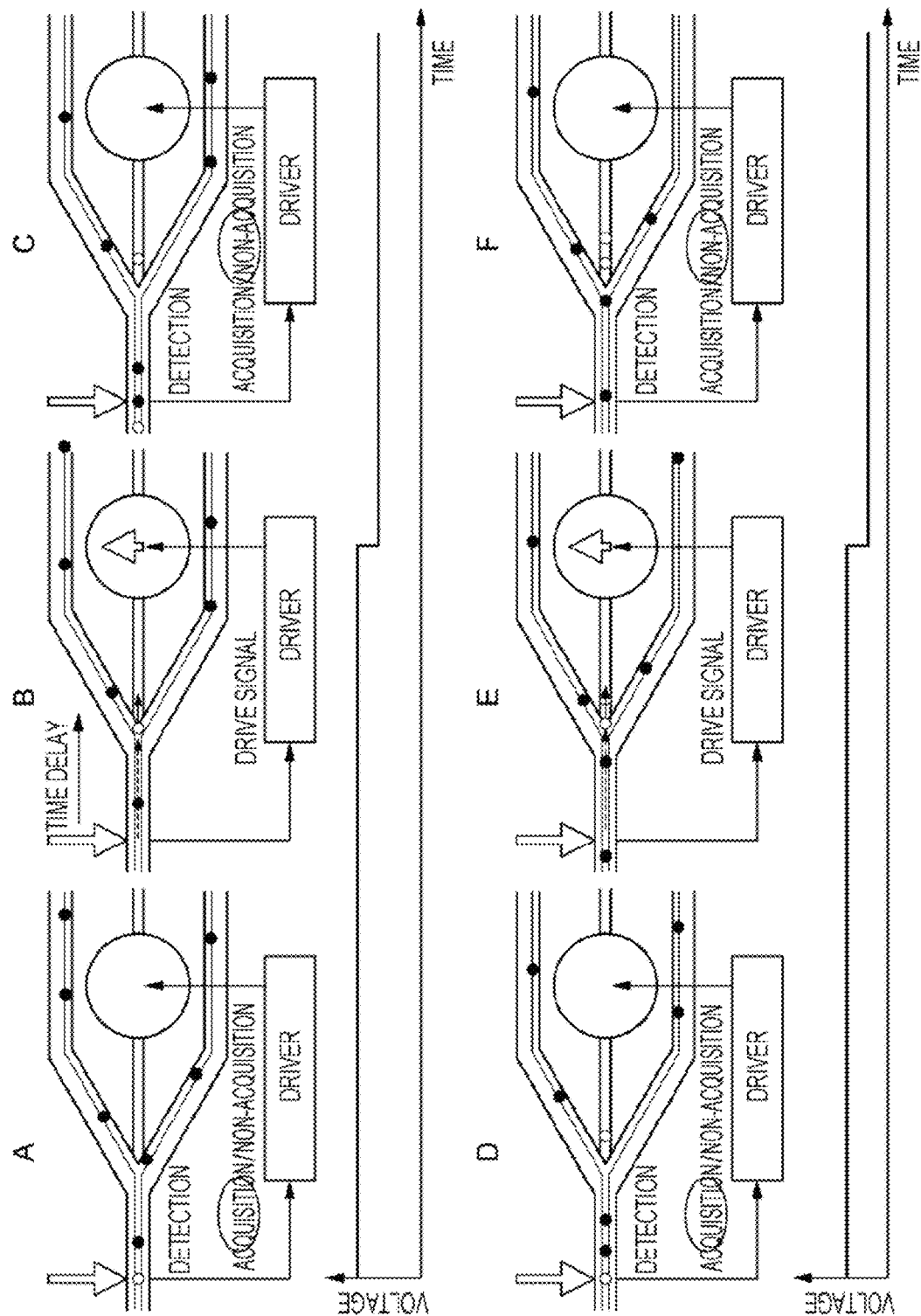
[Fig. 6]

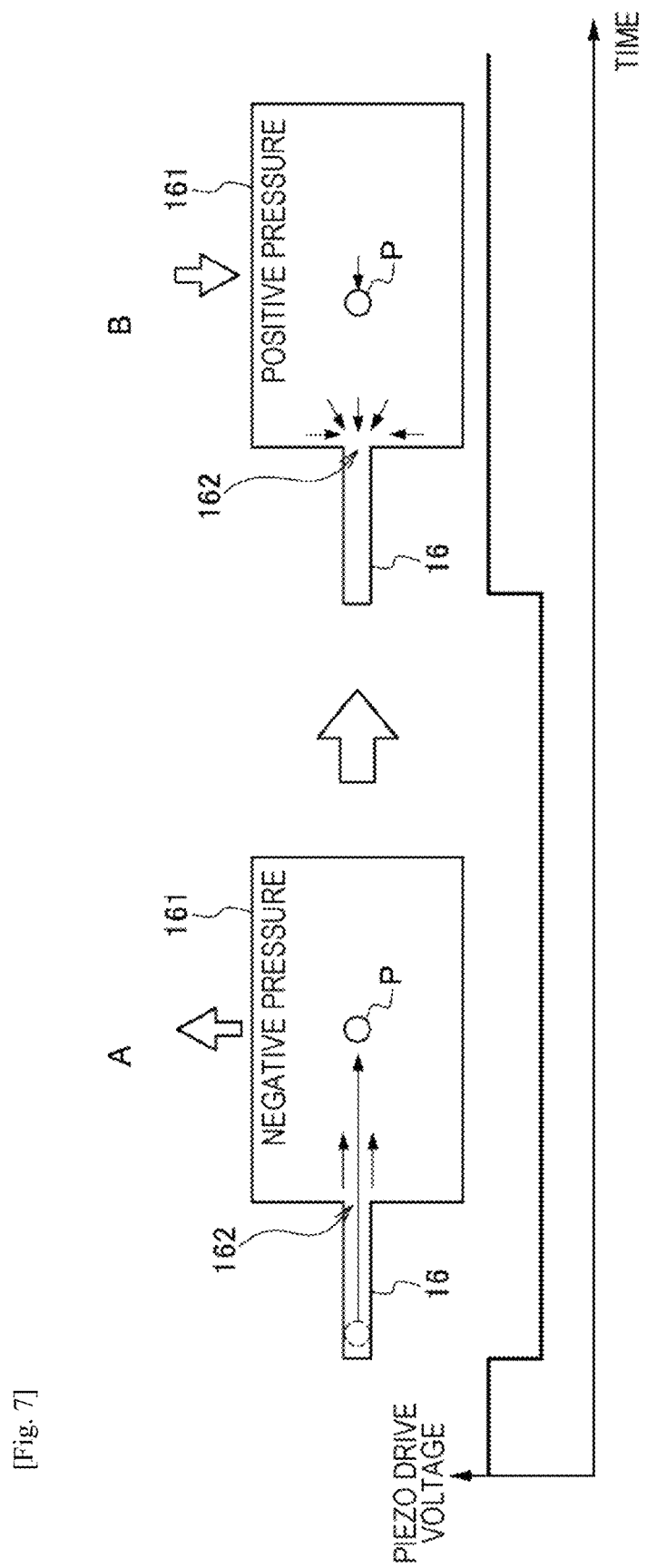
[Fig. 7]

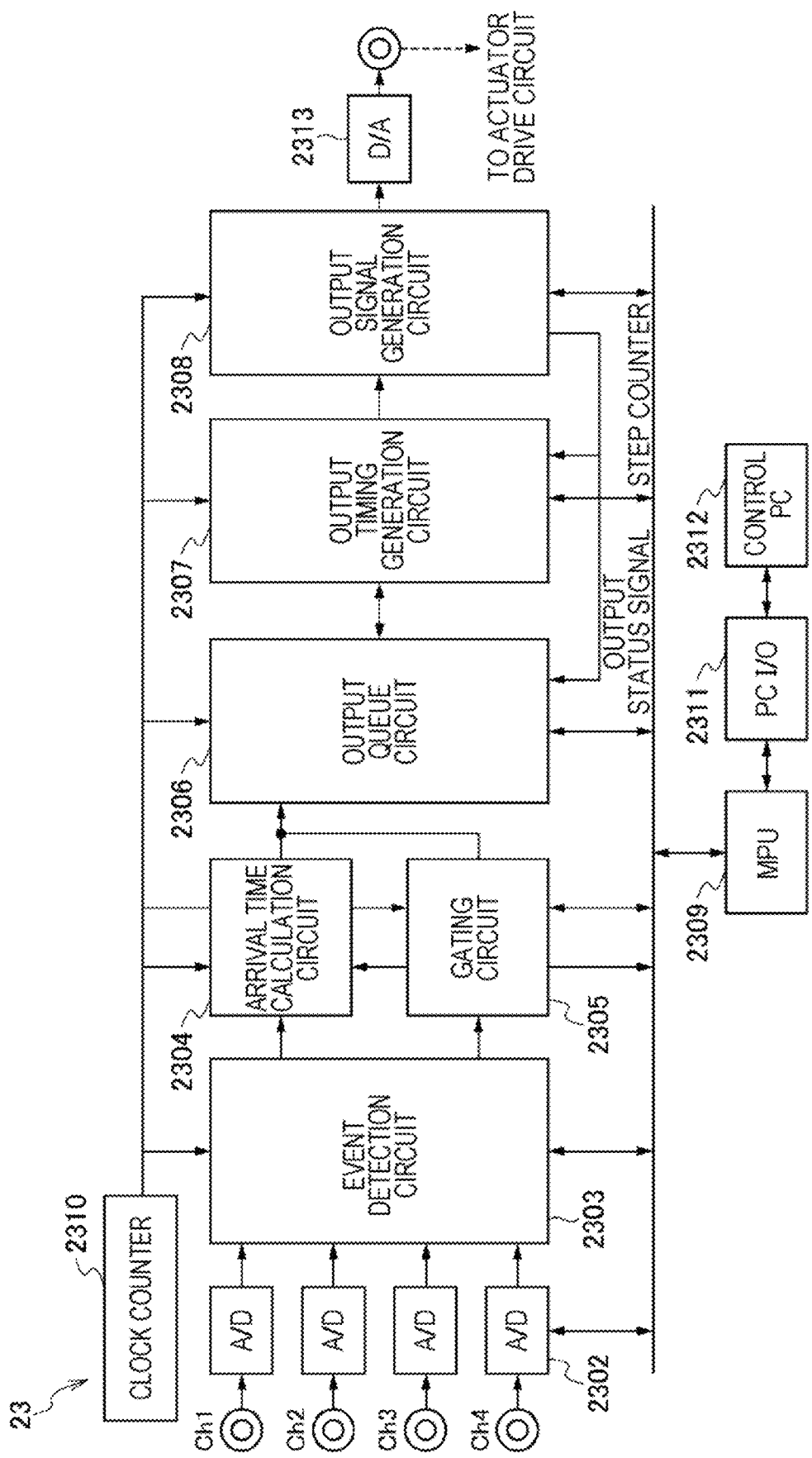
[Fig. 8]

[Fig. 9]
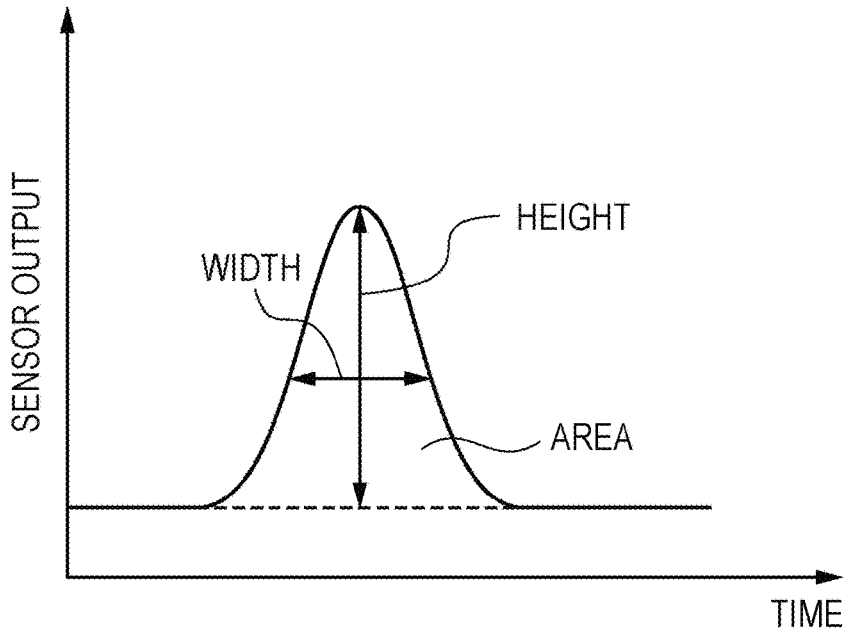
[Fig. 10]
| EVENT NUMBER | NUMBER OF ELECTRIC SIGNAL AS TRIGGER SIGNAL | TRIGGER SIGNAL DETECTION TIME | |
|---|---|---|---|
| TIME AT WHICH MICROPARTICLE NEEDS TO BE FETCHED | | FIRST FLAG | SECOND FLAG |
| Ch1 Area | | | |
| Ch2 Area | | | |
| Ch3 Area | | | |
| Ch4 Area | | | |
| Ch1 Height | | | |
| Ch2 Height | | | |
| Ch3 Height | | | |
| Ch4 Height | | | |
| Ch1 Width | | | |
| Ch2 Width | | | |
| Ch3 Width | | | |
| Ch4 Width | | | |

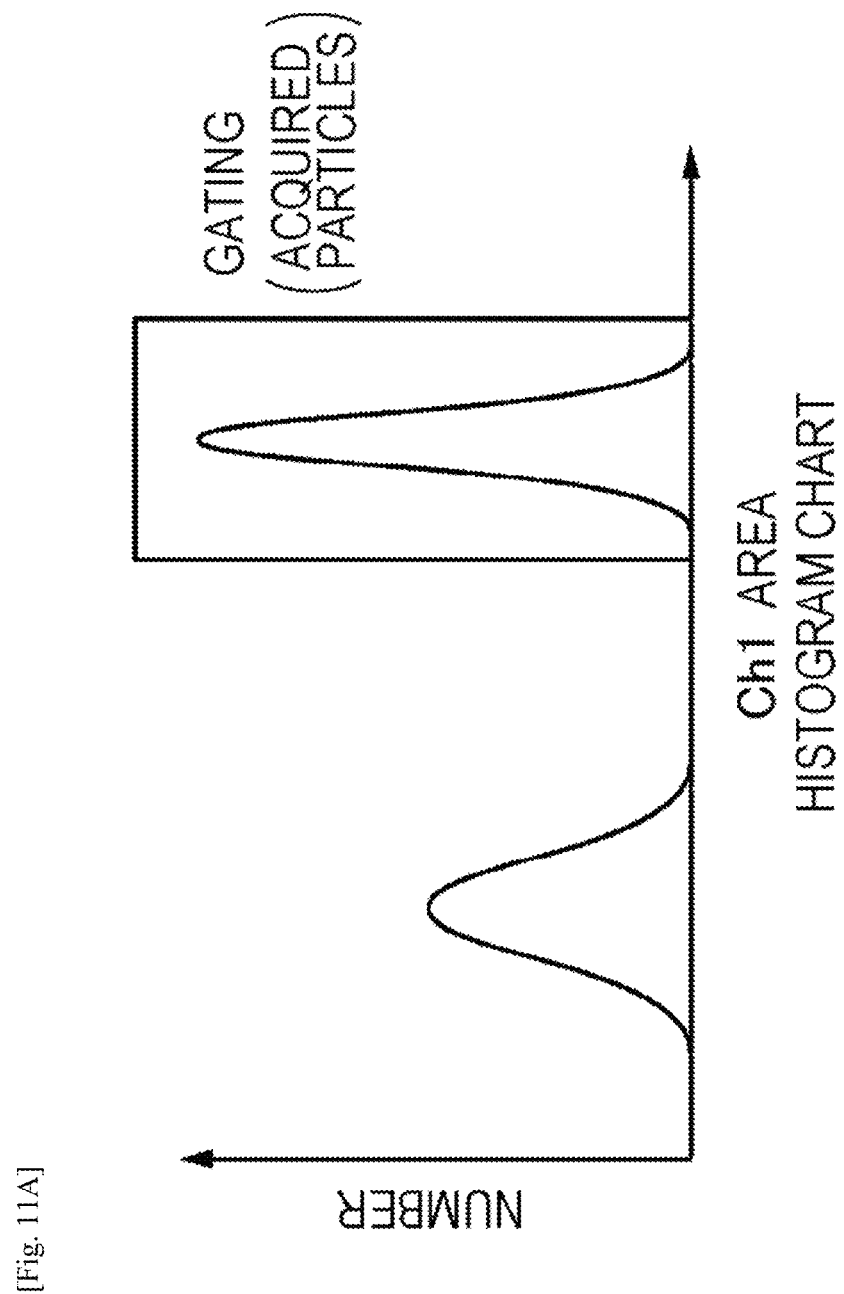
[Fig. 11A]

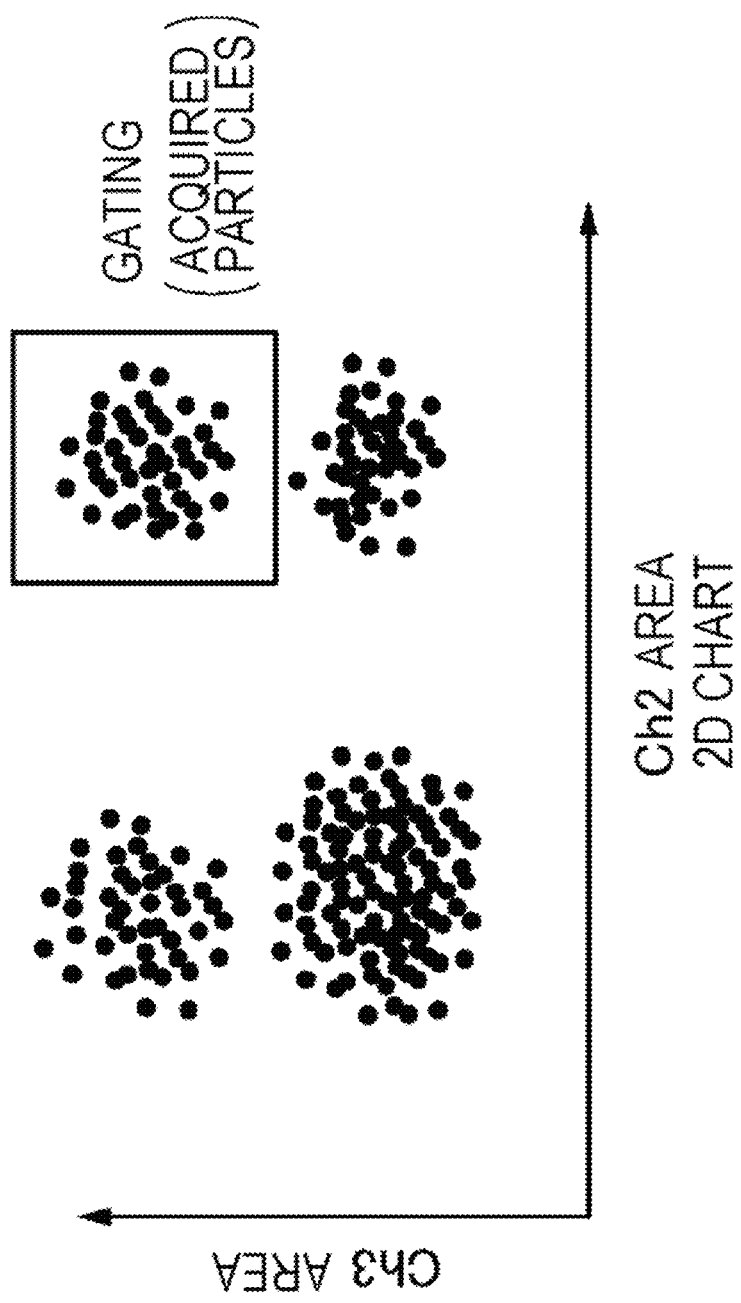

[Fig. 12]
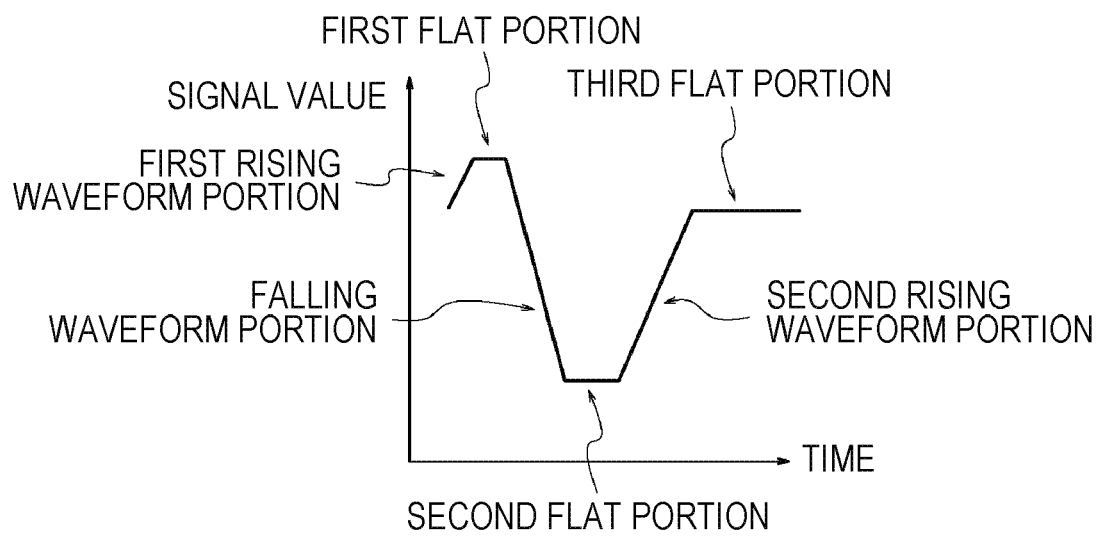

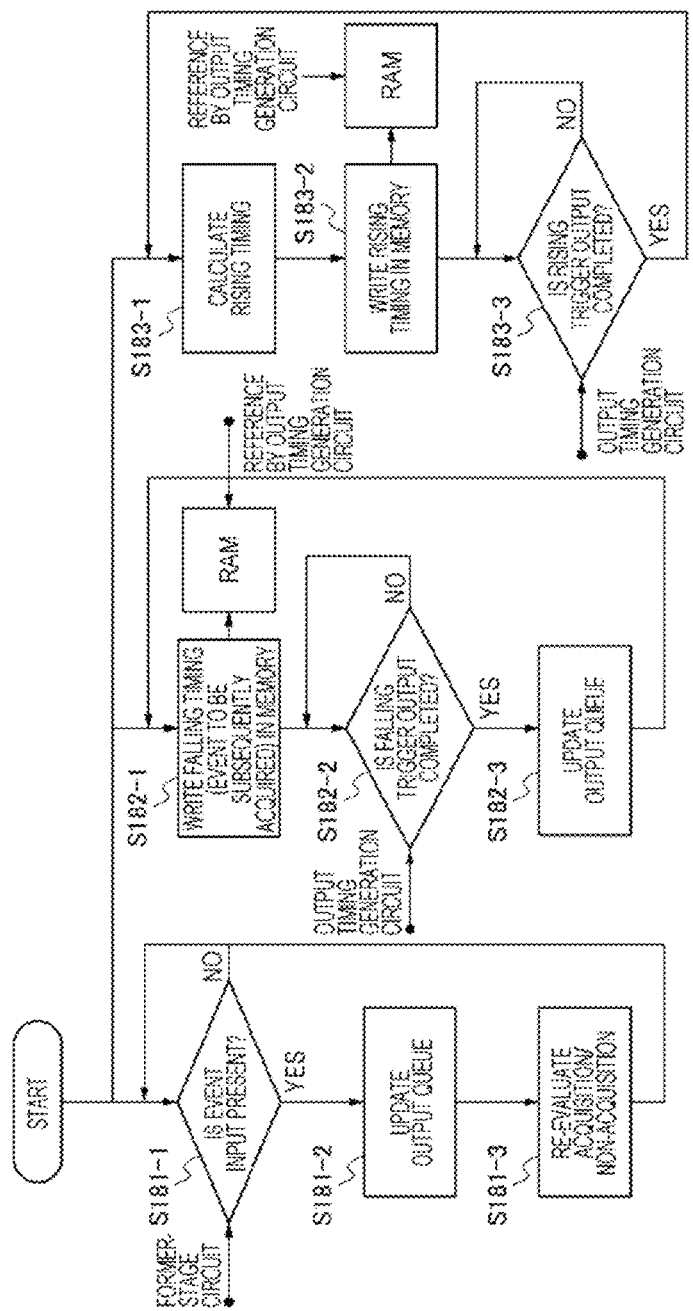
[Fig. 13]

[Fig. 14]
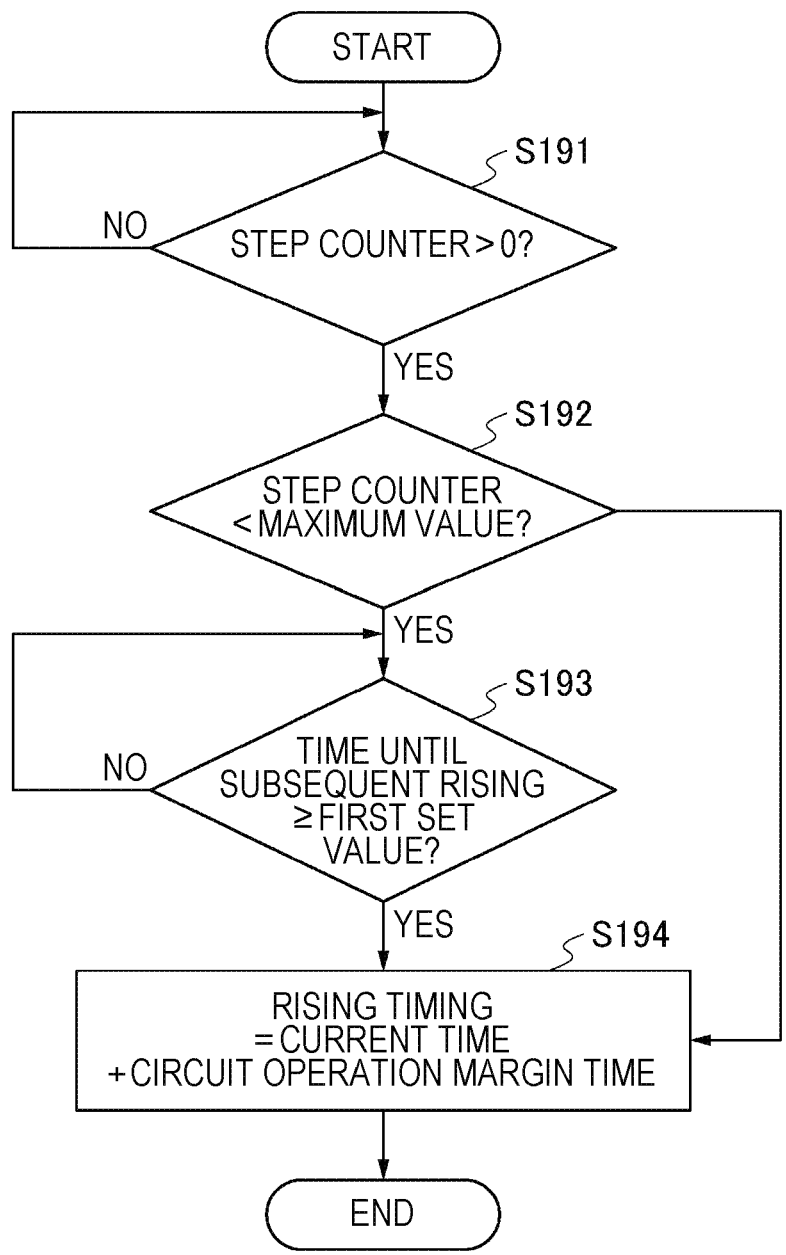
[Fig. 15A]
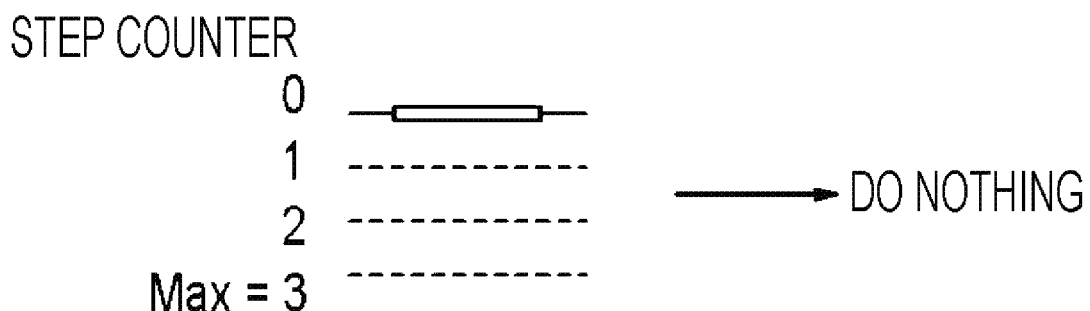

[Fig. 15B]
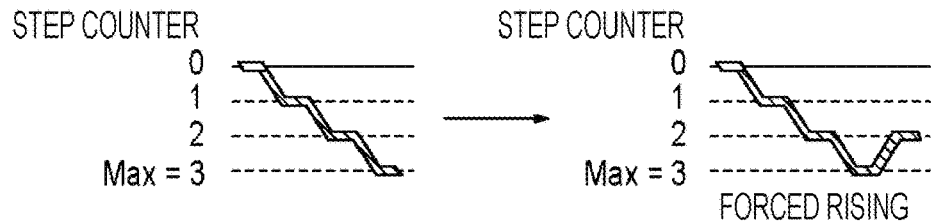
[Fig. 15C]
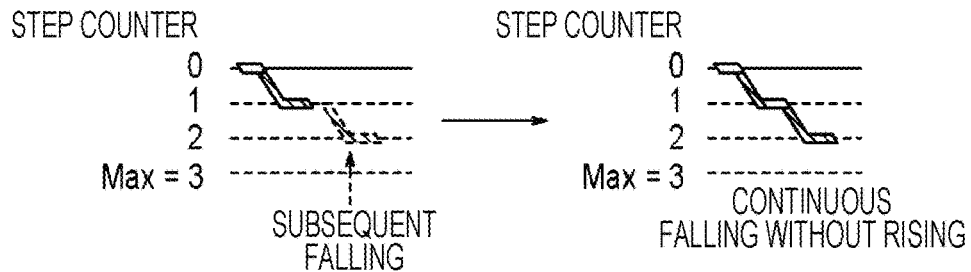
[Fig. 15D]
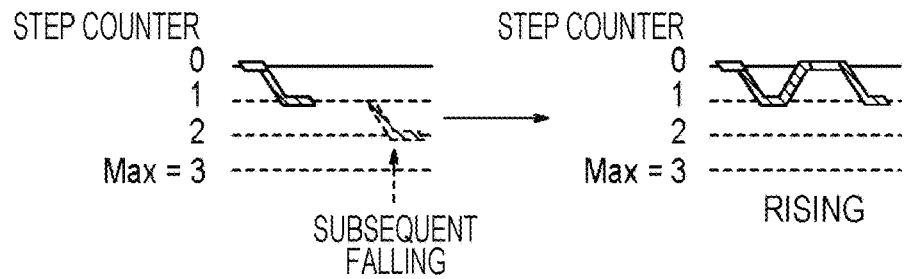
[Fig. 15E]
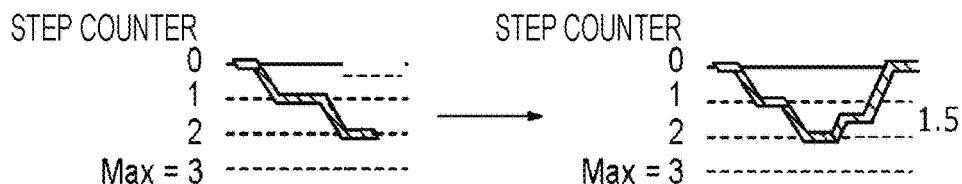
[Fig. 15F]
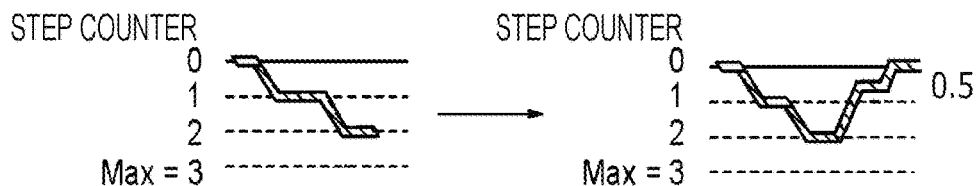
[Fig. 15G]
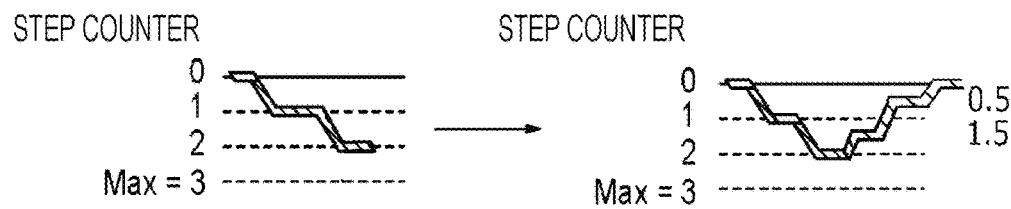

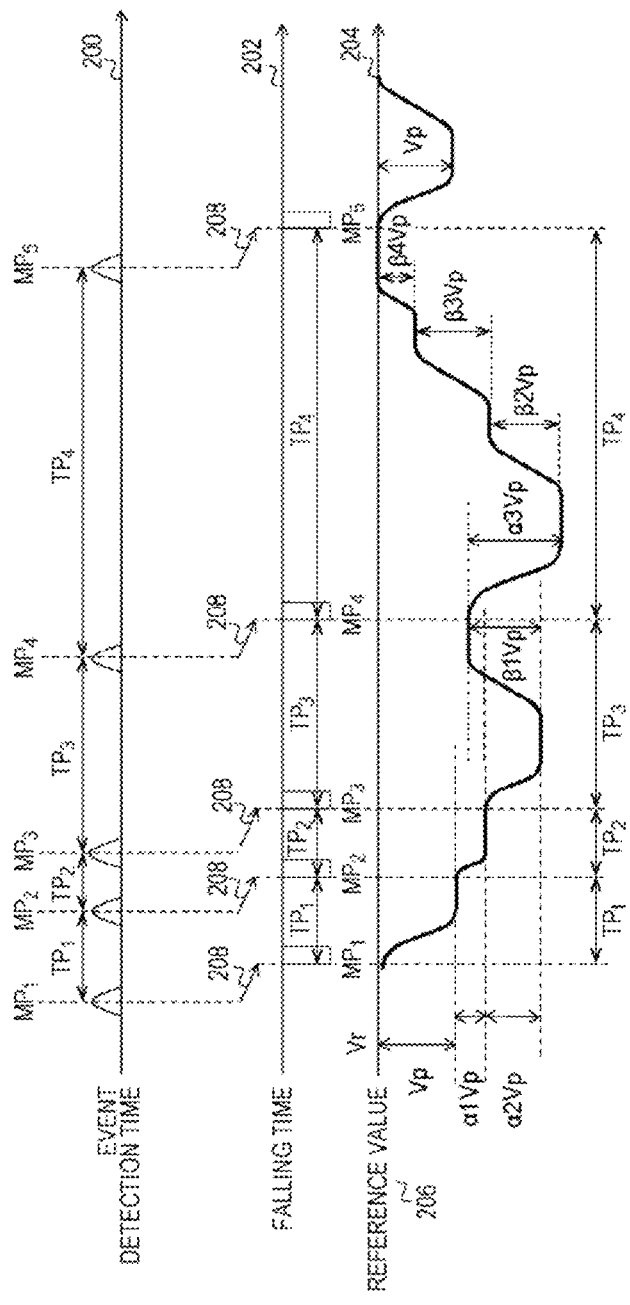
[Fig. 16]

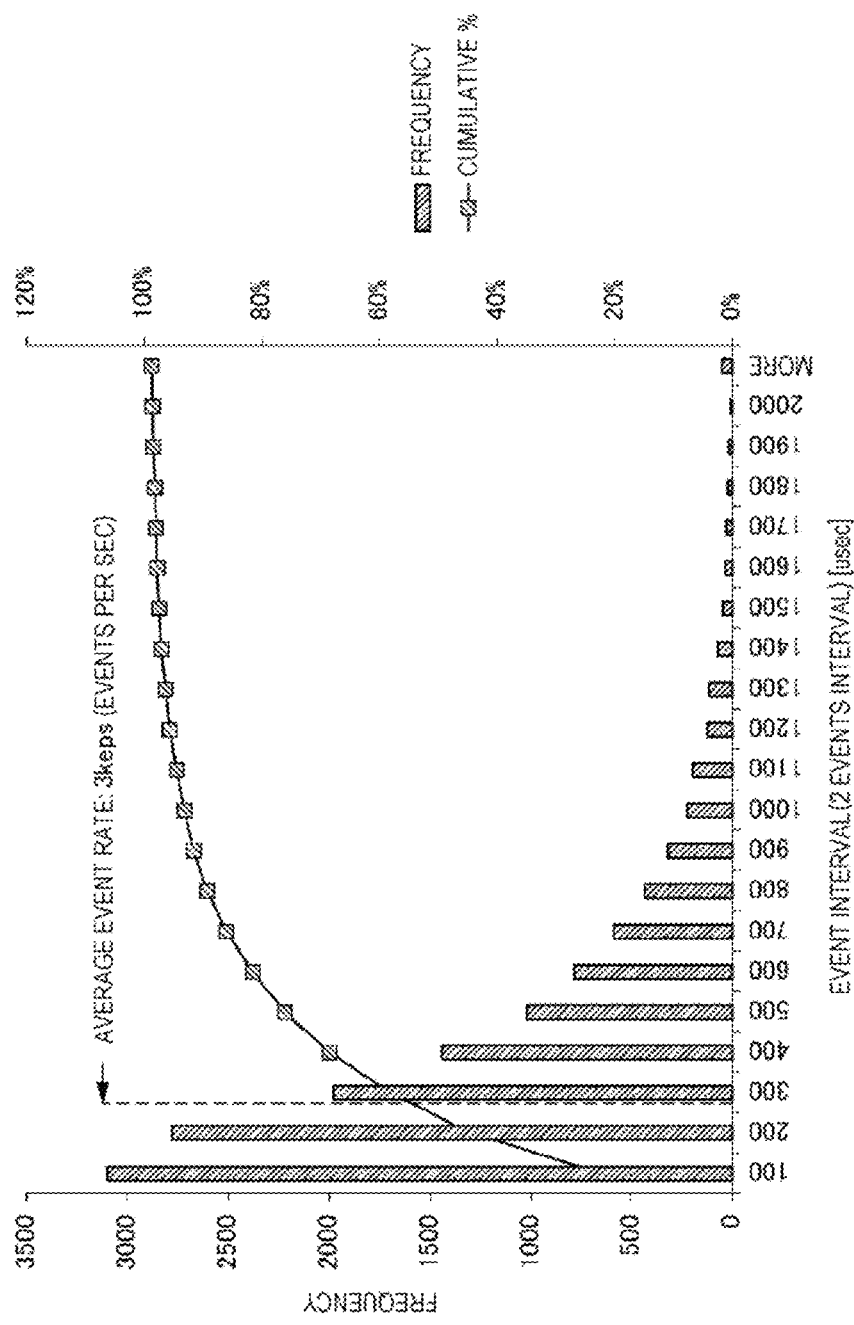
[Fig. 17]

[Fig. 18]
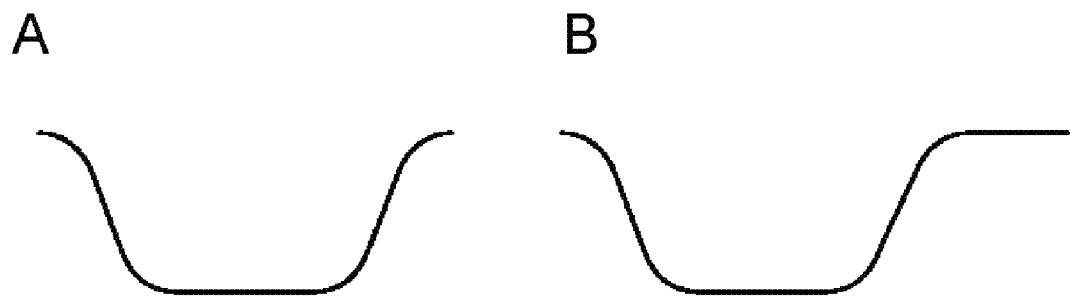
[Fig. 19]
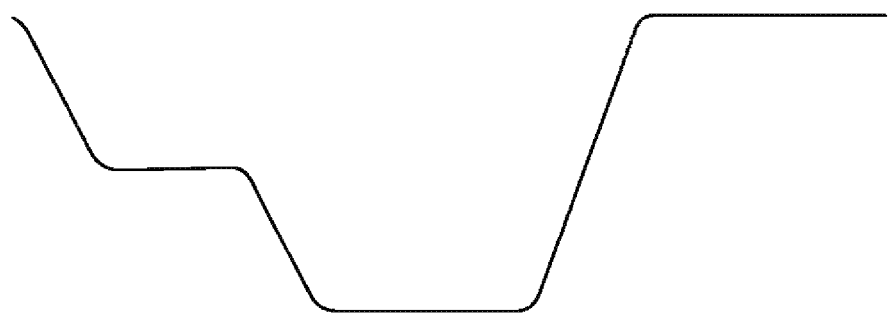
[Fig. 20]
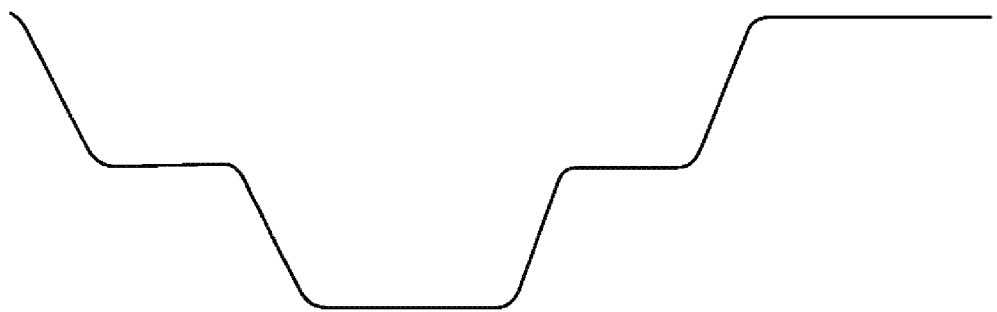

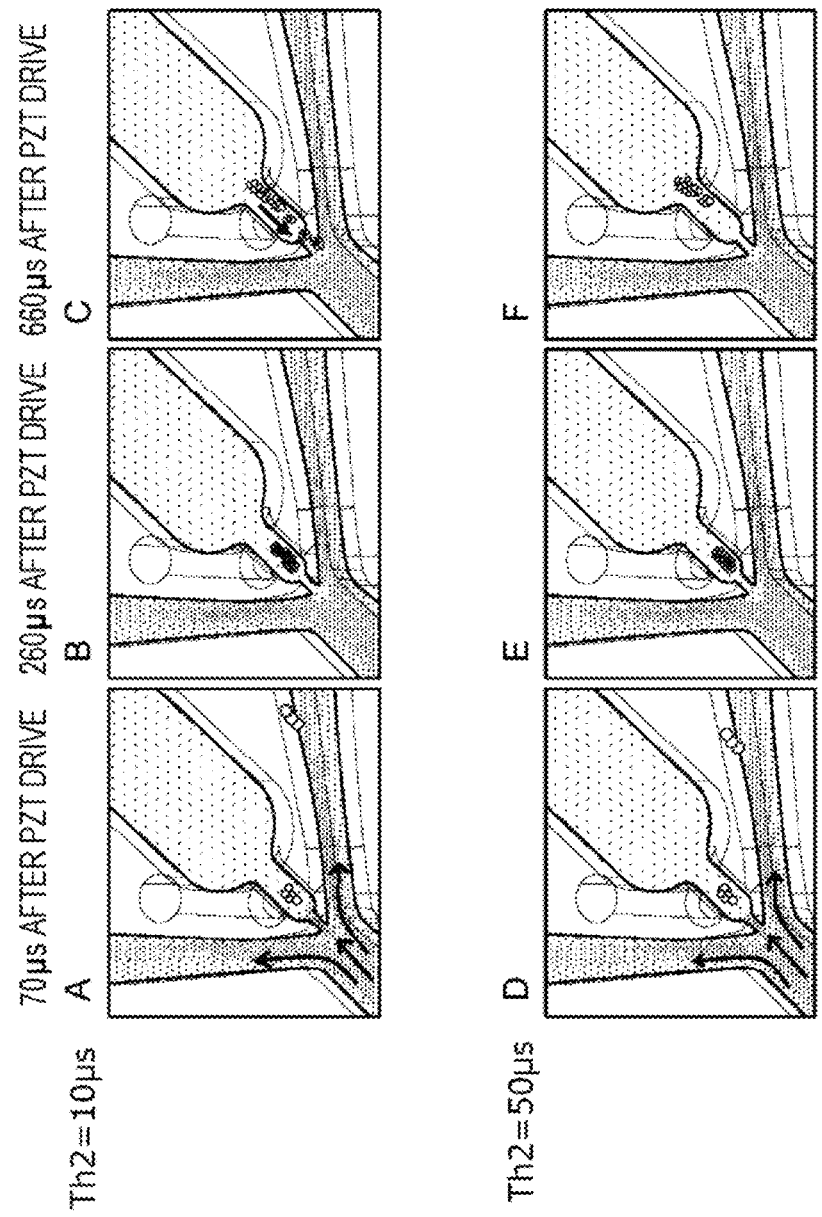

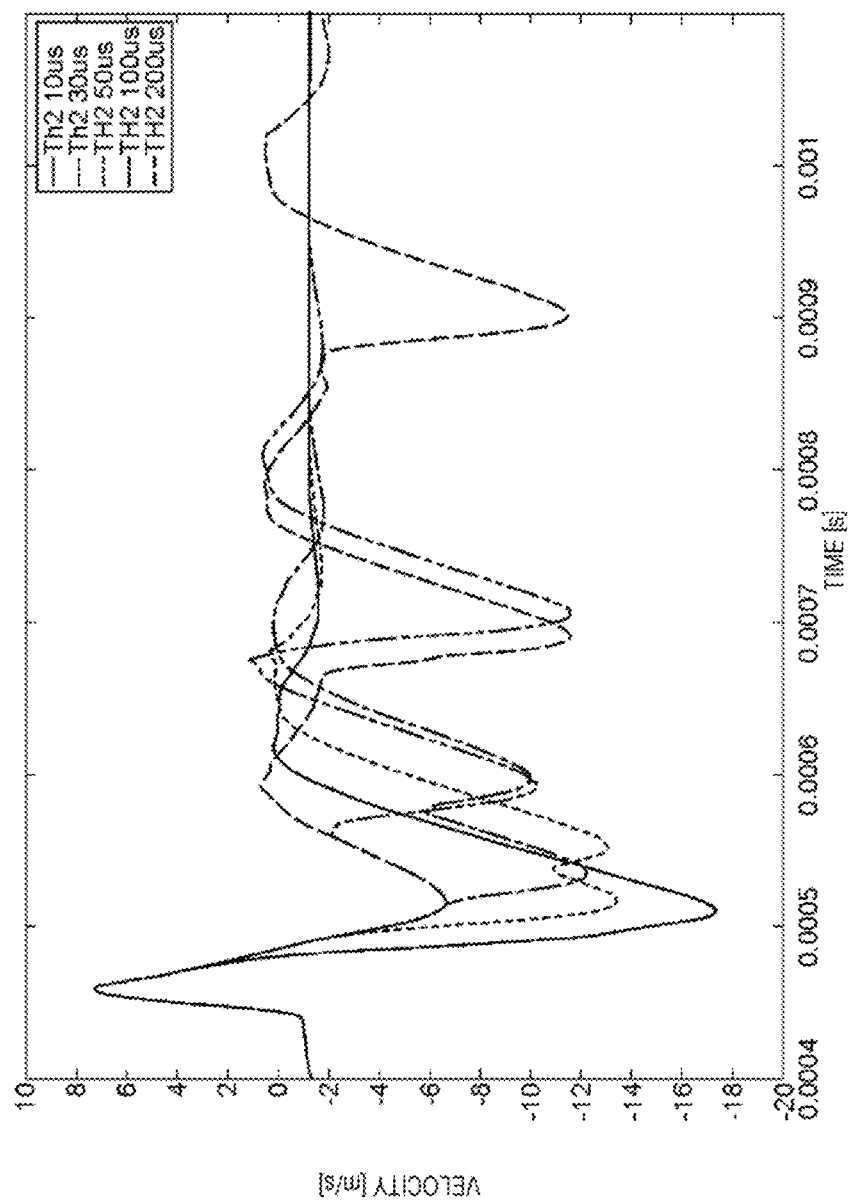
[Fig. 22]

[Fig. 23]
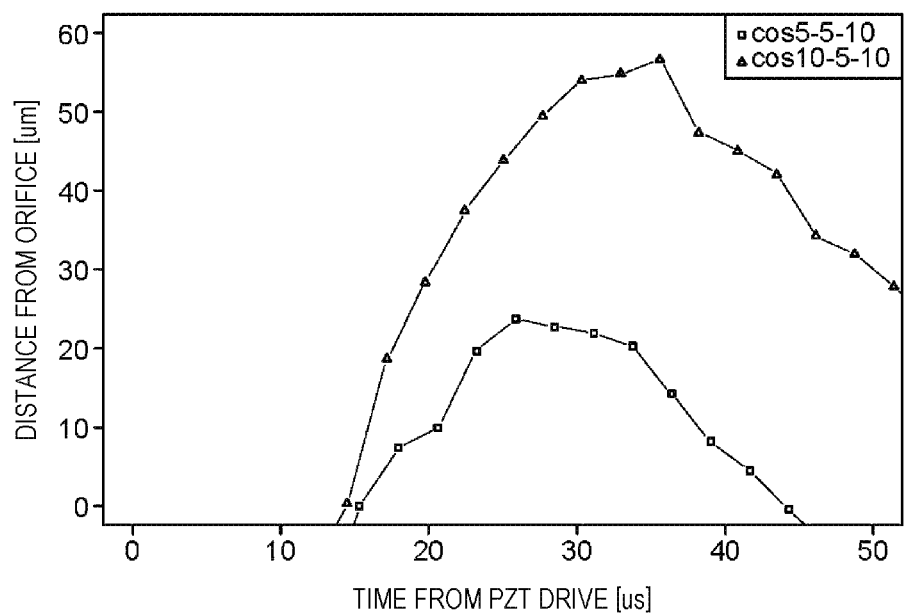

[Fig. 24]
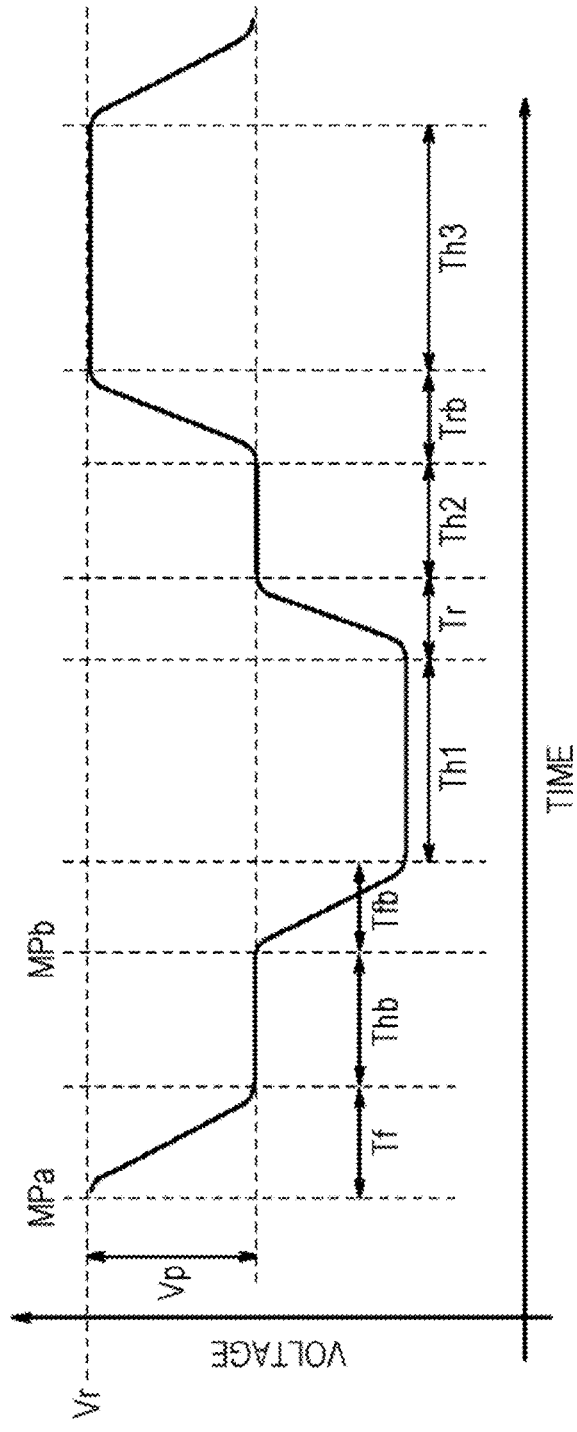

[Fig. 25A]
CASE OF Tp<Tf
(SUCTION OPERATION IS STOPPED IN THE MIDDLE AND
SINGLE PULSE DRIVE IS PERFORMED)
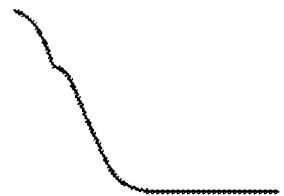

[Fig. 25B]
CASE OF Tf < Tp
(DRIVE IS PERFORMED TWICE IN SUCCESSION
WITH SAME VOLTAGE)
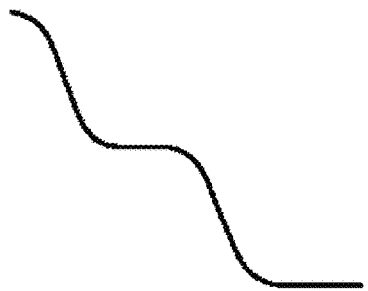
[Fig. 26]
A SUCTION OPERATION   B HOLDING TIME   C DISCHARGING OPERATION
[Fig. 27]
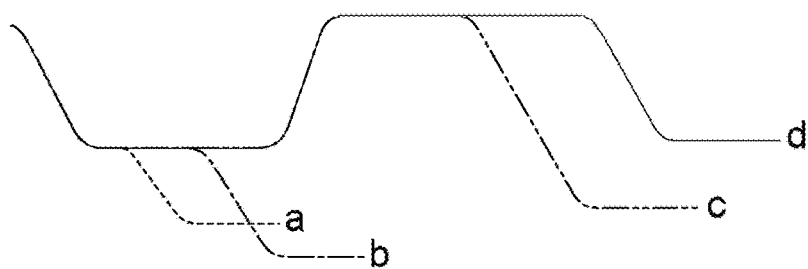

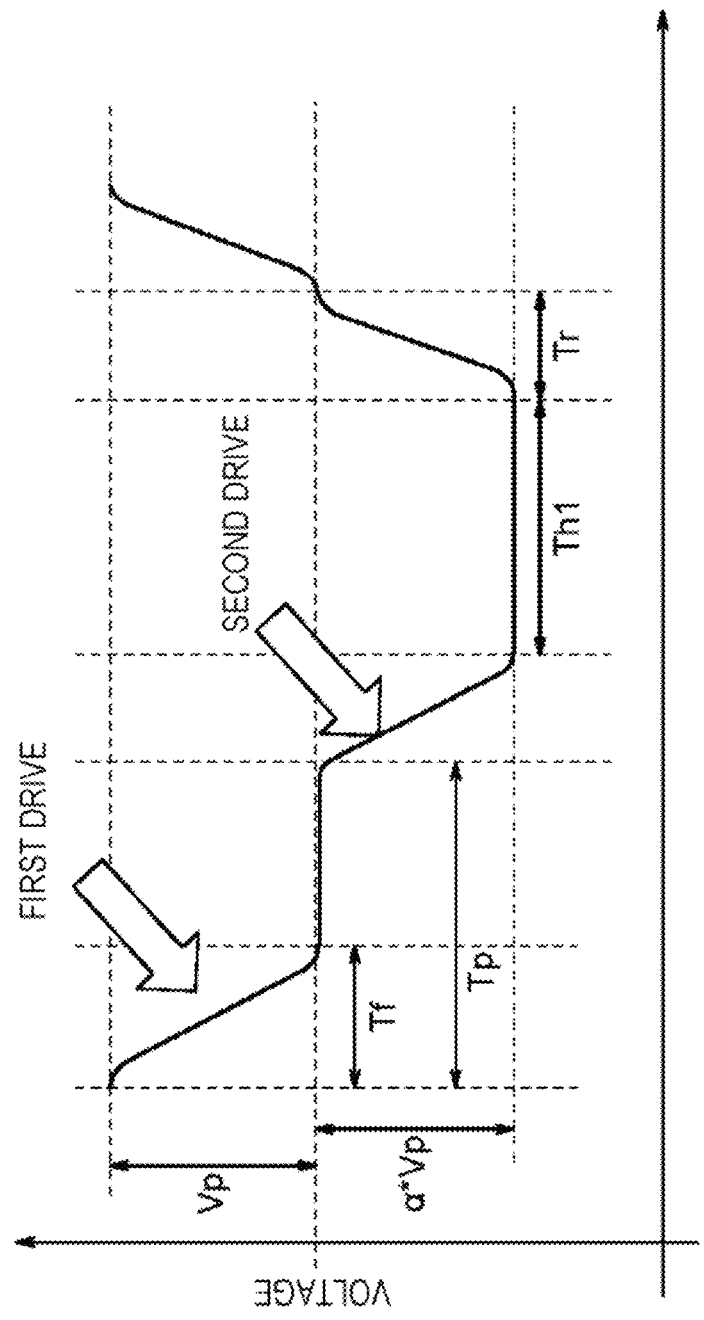

[Fig. 29]
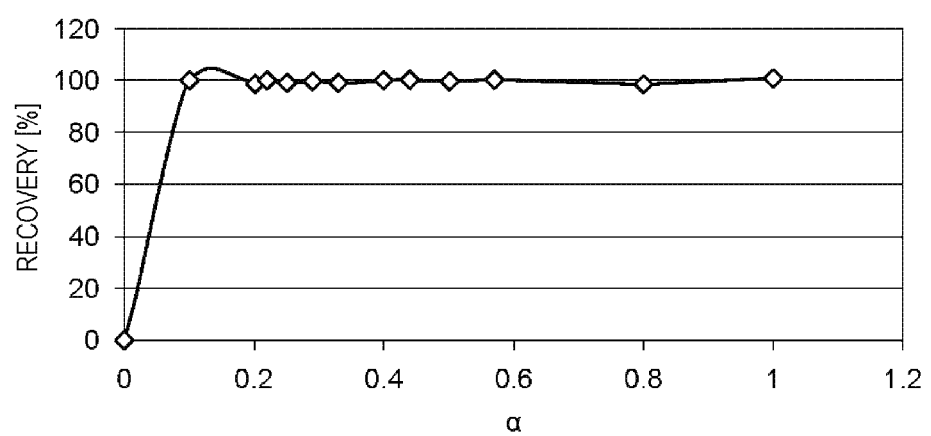

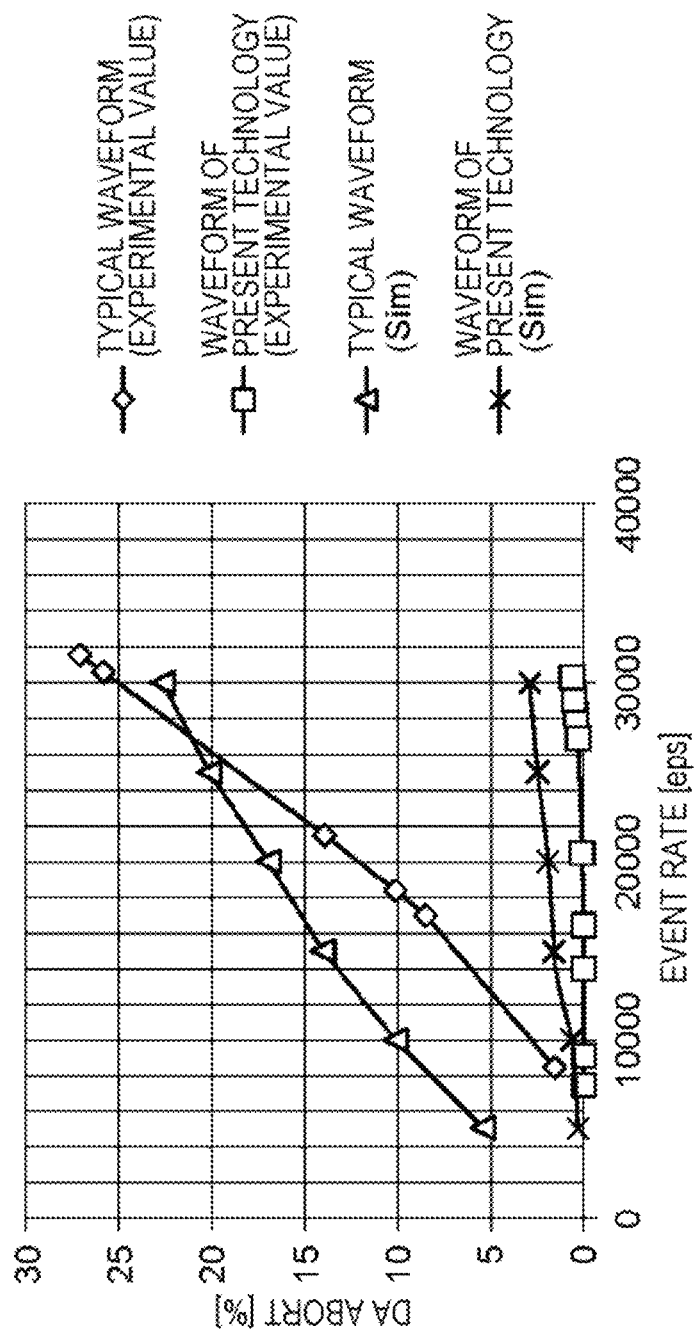
[Fig. 30]

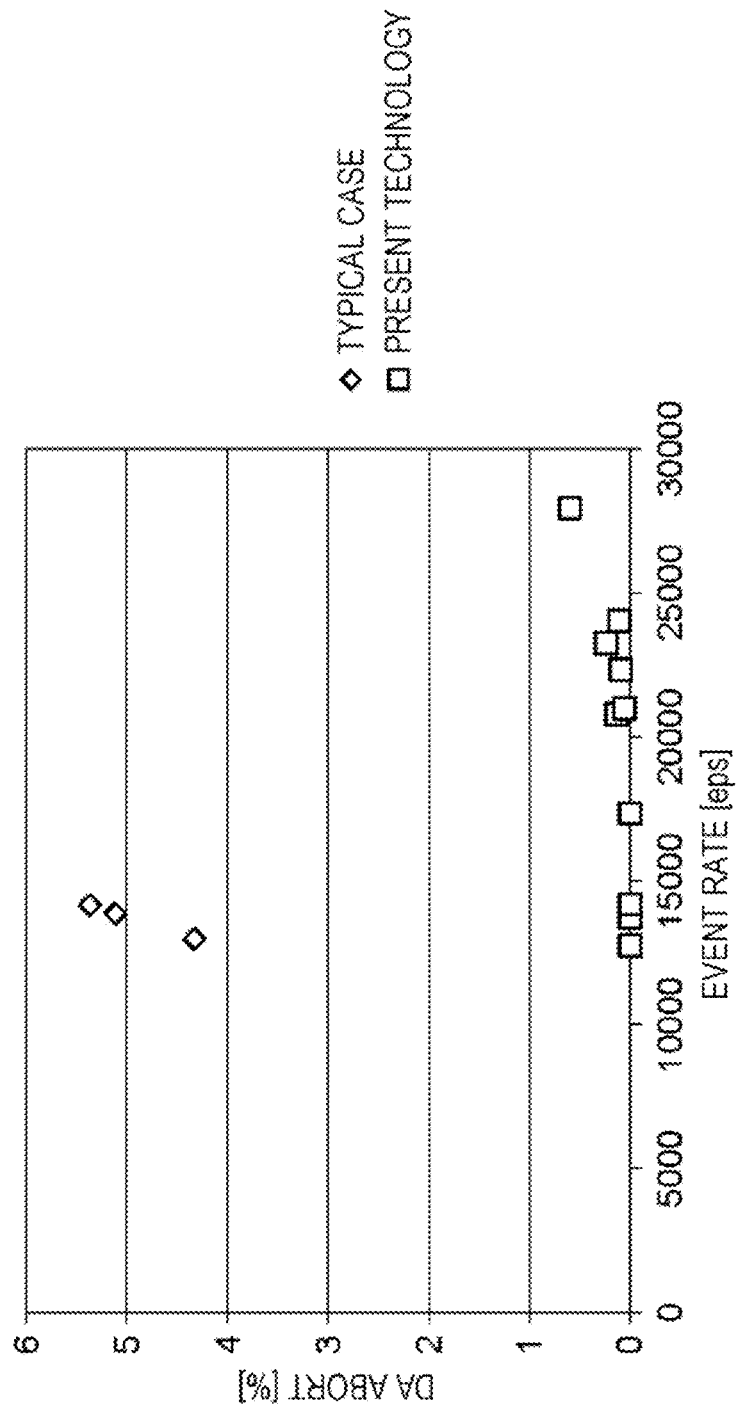
[Fig. 31]

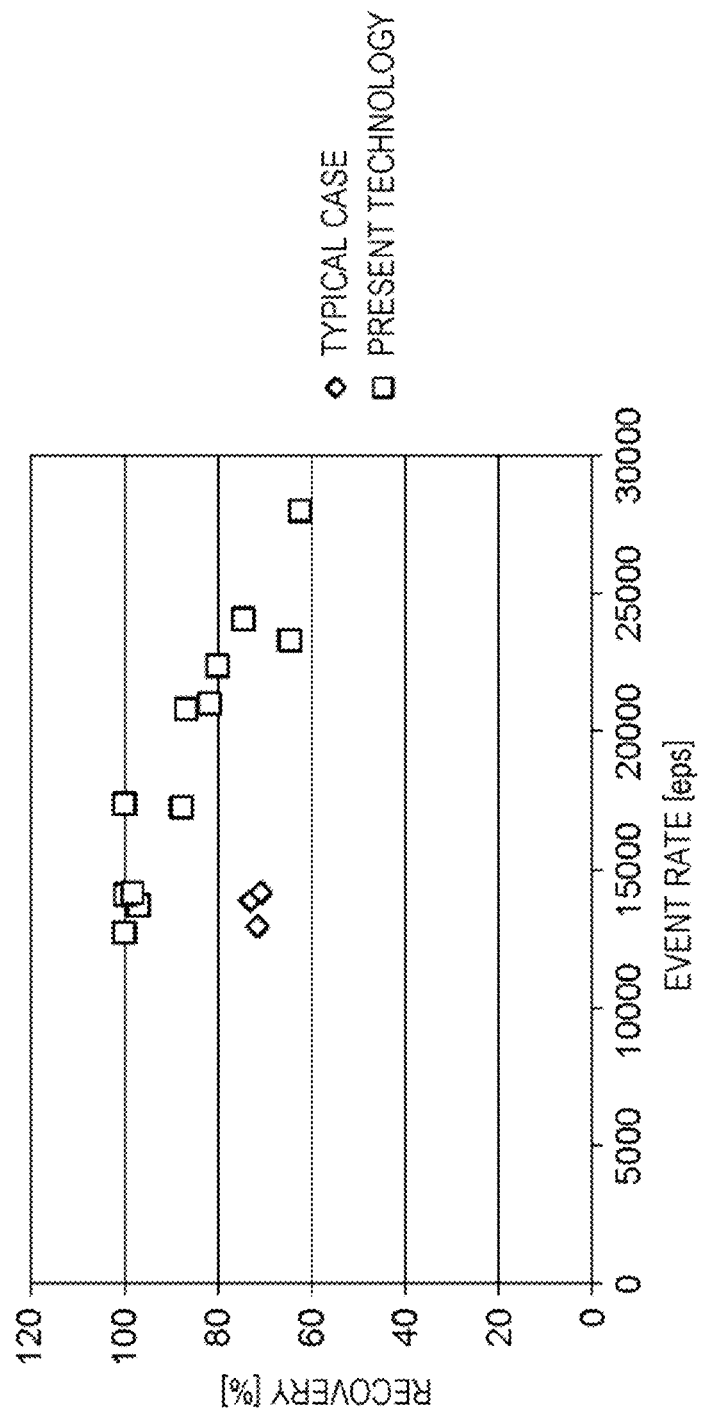
[Fig. 32]

[Fig. 33]
SETTINGS  Tf+Tr+Th1+Th3=35us  
Tmax=70us
OPERATION ACCORDING TO  
α=1-k1|Tmax-ΔT|/Tmax
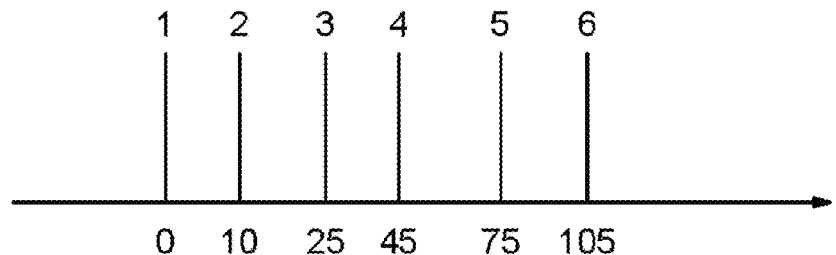
[Fig. 34]
SETTINGS  Tf+Tr+Th1+Th3=35us  
Tmax=70us
OPERATION ACCORDING TO  
α=1-k1|Tmax-ΔT|/Tmax  
※ΔT= Ti-T1 while ΔT < Tmax
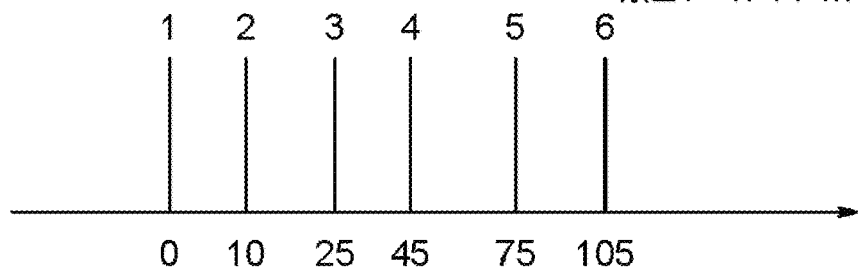
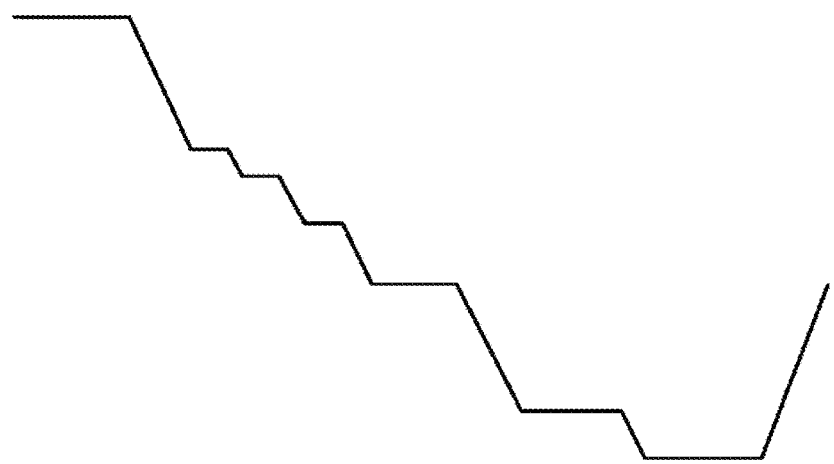

[Fig. 35]
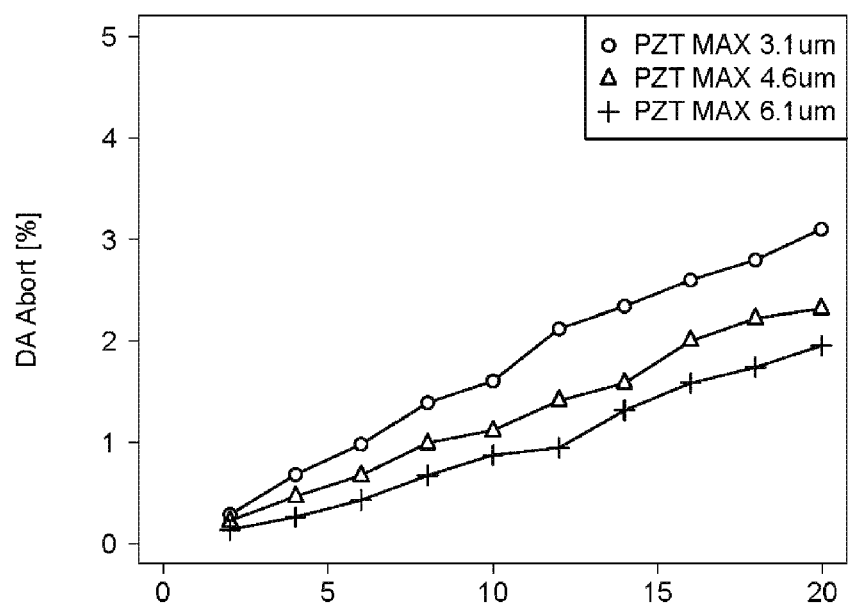

MICROPARTICLE SEPARATION METHOD, MICROPARTICLE SEPARATION PROGRAM, MICROPARTICLE SEPARATION SYSTEM

CROSS REFERENCE TO RELATED APPLICATIONS

This is a U.S. National Stage Application under 35 U.S.C. § 371, based on International Application No. PCT/JP2019/000061, filed Jan. 7, 2019, which claims priority to Japanese Priority Patent Application JP 2018-060517 filed on Mar. 27, 2018, the entire contents of which are incorporated herein by reference.

TECHNICAL FIELD

The present technology relates to a microparticle separation method, a microparticle separation program, and a microparticle separation system.

BACKGROUND ART

Typically, in a microparticle separation device such as a flow site meter, there has been a challenge that only target microparticles are stably removed at high speed from a sheath flow in a flow path.

For meeting such a challenge, e.g., a microparticle separation method described in Patent Literature 1 has been developed.

The microparticle separation method of Patent Literature 1 is specifically a method for extracting, by generation of negative pressure, microparticles in liquid flowing in a main flow path into a partial region, i.e., a pressure chamber, formed with a larger cross-section perpendicular to a liquid flow direction in a branched flow path communicating with the main flow path than other portions. Moreover, for generation of the negative pressure in the pressure chamber, an actuator provided outside the pressure chamber such that an inner space of the pressure chamber is deformed is used.

CITATION LIST

Patent Literature

PTL 1: JP 2014-39534A

SUMMARY

Technical Problem

In the microparticle separation method, when a subsequent microparticle is separated after a single microparticle has been separated, even if spacing between the microparticles is small or large, constant voltage is applied to the actuator.

However, there is a phenomenon that the flow of liquid delays as compared to drive of the actuator. For this reason, when the spacing between the microparticles is small, if the constant voltage is applied, extra drive voltage is applied to separate the microparticles.

Since the actuator is operated with such extra drive voltage, there are more limitations on the number of times of available multistep drive of the actuator.

Moreover, a certain level of disturbance remains in the flow of microparticles or the sheath flow. Thus, the constant voltage is also applied even in a case where it is desired to apply much higher voltage to the actuator when the microparticles are separated.

Further, the liquid sucked together with the microparticles targeted for separation is accumulated in a separation region when separation of the microparticles continues. It is desired to discharge, as necessary, the accumulated unnecessary liquid from the separation region.

For solving such an issue, the present technology is mainly intended to provide a microparticle separation method using a microparticle separation microchip to control separation of microparticles and discharging of liquid from a separation region.

Solution to Problem

According to an embodiment of the present technology, the present technology provides a microparticle separation method using a microparticle separation microchip including a main flow path in which a microparticle flows and a pressure chamber communicating with the main flow path, including: generating negative pressure in the pressure chamber communicating with the main flow path to separate and fetch the microparticle in liquid flowing in the main flow path into the pressure chamber; and generating positive pressure equal to or lower than a total absolute value of the negative pressure generated in the pressure chamber to discharge the liquid from the pressure chamber to the main flow path, in which the negative pressure or the positive pressure is controlled by a time interval of detection of the microparticle in the liquid flowing in the main flow path.

The microparticle separation method may further include: after the generating the negative pressure in the pressure chamber communicating with the main flow path to separate and fetch the microparticle in the liquid flowing in the main flow path into the pressure chamber, holding an inner pressure of the pressure chamber for a certain time, and generating, in a case where the certain time is equal to or shorter than a predetermined value, further negative pressure in the pressure chamber to separate and fetch a subsequent microparticle in the liquid flowing in the main flow path into the pressure chamber.

In addition, the further negative pressure may be controlled by an interval between a time at which the microparticle in the liquid flowing in the main flow path has been detected and a time at which the subsequent microparticle in the liquid flowing in the main flow path has been detected.

Furthermore, it is preferable that the further negative pressure is equal to or lower than the negative pressure initially applied.

In addition, at the steps, a procedure may be performed in which a force of deforming an inner space of the pressure chamber is applied from an actuator to generate the negative pressure or the positive pressure, and to increase or decrease a volume of the inner space.

At the procedure, a drive waveform including a pulse waveform, a step waveform, or an undershoot-containing step waveform may be applied to the actuator.

Application of the pulse waveform may be separately controlled for a falling waveform portion and a rising waveform portion.

In addition, a voltage of the falling waveform portion may be controlled by the time interval of detection of the microparticle in the liquid flowing in the main flow path.

In addition, the voltage of the falling waveform portion may be controlled to equal to or lower than a maximum voltage in a case where an interval between a time at which the microparticle in the liquid flowing in the main flow path has been detected and a time at which the subsequent microparticle in the liquid flowing in the main flow path has been detected is equal to or shorter than a predetermined value.

Furthermore, the falling waveform portion may be controlled such that the maximum voltage is applied again after a lapse of a certain time from application of the maximum voltage.

In addition, the microparticle separation method may further include: after the generating the negative pressure in the pressure chamber communicating with the main flow path to separate and fetch the microparticle in the liquid flowing in the main flow path into the pressure chamber, holding an inner pressure of the pressure chamber for a certain time, and generating, in a case where the certain time is equal to or longer than a predetermined value, positive pressure lower than the total absolute value of the negative pressure generated in the pressure chamber to discharge the liquid from the pressure chamber to the main flow path.

In addition, after the generating the positive pressure equal to or lower than the total absolute value of the negative pressure generated in the pressure chamber to discharge the liquid from the pressure chamber to the main flow path, holding an inner pressure of the pressure chamber for a period equal to or longer than 50 µs may further be included.

Furthermore, after holding the inner pressure of the pressure chamber for a period equal to or longer than 50 µs, generating further positive pressure in the pressure chamber to discharge further liquid from the pressure chamber to the main flow path may further be included.

In addition, when generating the further positive pressure in the pressure chamber to discharge the further liquid from the pressure chamber to the main flow path, the further positive pressure may be positive pressure within a difference range between the total absolute value of the negative pressure and the positive pressure.

In addition, the present technology could provide a microparticle separation program for causing a computer to execute, in a microparticle separation microchip including a main flow path in which a microparticle flows and a pressure chamber communicating with the main flow path, generating negative pressure in the pressure chamber communicating with the main flow path to separate and fetch the microparticle in liquid flowing in the main flow path into the pressure chamber, generating positive pressure equal to or lower than a total absolute value of the negative pressure generated in the pressure chamber to discharge the liquid from the pressure chamber to the main flow path, and controlling the negative pressure or the positive pressure by a time interval of detection of the microparticle in the liquid flowing in the main flow path.

Furthermore, the present technology could provide a microparticle separation system including: a microparticle separation microchip including a main flow path in which a microparticle flows and a pressure chamber communicating with the main flow path; a microchip mounting portion on which the microparticle separation microchip is mounted; a light irradiator configured to irradiate, with light, a microparticle detection region included in the main flow path; a detector configured to detect scattered light and/or fluorescence emitted from the microparticle; and a pressure chamber controller configured to bring an inside of the pressure chamber into negative pressure or positive pressure, in which the pressure chamber controller is controlled by a microparticle separation program for causing a computer to execute: generating the negative pressure in the pressure chamber communicating with the main flow path to separate and fetch the microparticle in liquid flowing in the main flow path into the pressure chamber, generating the positive pressure equal to or lower than a total absolute value of the negative pressure generated in the pressure chamber to discharge the liquid from the pressure chamber to the main flow path, and controlling the negative pressure or the positive pressure by a time interval of detection of the microparticle in the liquid flowing in the main flow path.

Furthermore, embodiments of the present technique could provide a method of extracting microparticles, the method comprising detecting target microparticles for extraction in a main flow path which communicates with a pressure chamber generating for each of the detected target microparticles a change in a negative pressure in the pressure chamber communicating with the main flow path to separate and to extract each of the detected target microparticles flowing in the main flow path into the pressure chamber. The generating the change of the negative pressure to extract the detected target microparticles comprises generating a negative change in pressure by a different amount in accordance with a separation between the detected target microparticles. As will be explained in the example embodiments disclosed herein, by dynamically changing the amount of change in the pressure in the pressure chamber in accordance with which of the microparticles in the sequence of microparticles is being extracted, a greater number of the microparticles in the sequence can be extracted, thereby improving a yield of a sample of the microparticles.

Advantageous Effects of Invention

According to the present technology, the microparticles in the liquid can be separated with lower voltage, the liquid extracted together with the microparticles can be discharged without discharging the separated microparticles, and the microparticles can be separated with a high recovery rate, a high purity, and a high efficiency.

BRIEF DESCRIPTION OF DRAWINGS

FIG. 1 is a view for describing a configuration of a microparticle separation device A suitable for implementing a microparticle separation method.

FIG. 2 is a view for describing a configuration of a microchip 1a mounted on the microparticle separation device A.

FIG. 3 is a view for describing the configuration of the microchip 1a.

FIG. 4 is a view for describing the configuration of the microchip 1a.

FIGS. 5A to 5C are views for describing a configuration of a branched portion between a main flow path 15 and a separation flow path 16 in the microchip 1a.

FIG. 6 is a view for describing separation operation of the microparticle separation device A.

FIG. 7 is a view for describing a function of a pressure chamber 161 of the microchip 1a.

FIG. 8 is a block diagram for describing a configuration of a driver 23 of a microparticle separation system.

FIG. 9 is a graph for describing a waveform of an electrical signal read by an event detection circuit 2303.

FIG. 10 is a conceptual diagram for describing an event data packet.

FIGS. 11A and 11B are graphs for describing gating in the forms of a histogram chart and a 2D chart.

FIG. 12 is a schematic graph for describing a falling waveform portion and a rising waveform portion.

FIG. 13 is a first flowchart for describing the microparticle separation method.

FIG. 14 is a second flowchart for describing the microparticle separation method.

FIGS. 15A to 15G are charts for describing forms of calculation of rising timing according to a step counter value.

FIG. 16 is a time chart for describing the microparticle separation method.

FIG. 17 is a graph for describing distribution of an event time interval.

FIG. 18 is a graph of an actuator drive input waveform in a basic microparticle separation method.

FIG. 19 is a graph of the actuator drive input waveform in the basic microparticle separation method.

FIG. 20 is a graph of an actuator drive input waveform in the microparticle separation method.

FIG. 21 is a view of microparticle behavior at the branched portion of the separation flow path of the microparticle separation microchip.

FIG. 22 is a graph of a relationship between a certain time after rising of an actuator drive waveform and a separation portion (inside an orifice) flow velocity.

FIG. 23 is a graph of a relationship between a time elapsed after piezo element drive and a microparticle distance from an orifice inlet.

FIG. 24 is a graph of a relationship between an example of default settings of parameters and a piezo element drive waveform.

FIGS. 25A and 25B illustrate the piezo element drive waveforms in the case of Tp<Tf and the case of Tf<Tp.

FIG. 26 is a schematic view of a drive waveform with three types of parameters in the microparticle separation method.

FIG. 27 is a view of pattern examples of the Tp-dependent piezo element drive waveform.

FIG. 28 is a graph of an example of the piezo element drive waveform input in study.

FIG. 29 is a graph of a relationship between a function a and a microparticle recovery rate.

FIG. 30 is a graph of DA abort comparison between the basic microparticle separation method and the microparticle separation method of an embodiment of the present technology.

FIG. 31 is a graph of DA abort comparison between the basic microparticle separation method and the microparticle separation method of an embodiment of the present technology.

FIG. 32 is a graph of recovery rate comparison between the basic microparticle separation method and the microparticle separation method of an embodiment of the present technology.

FIG. 33 is a piezo element drive waveform example in a case where microparticles close to each other continuously arrive at the separation portion.

FIG. 34 is a preferable piezo element drive waveform example in a case where microparticles close to each other continuously arrive at the separation portion.

FIG. 35 is a graph of DA abort analysis results at an event rate for different maximum displacements of a piezo element.

DESCRIPTION OF EMBODIMENTS

Hereinafter, preferred embodiments of the present technology will be described. Note that the embodiments described below are representative embodiments of the present technology, and the scope of the present technology shall not be interpreted narrower by these embodiments. Description will be made in the following order.

1. Basic Microparticle Separation Method
1-1. Entire Configuration of Microparticle Separation Device
1-2. Outline of Configuration of Microchip
1-3. Basic Microparticle Separation Operation
1-4. Basic Drive Signal
2. Microparticle Separation Program
3. Microparticle Separation System
3-1. Entire Configuration of Driver
3-2. Details of Driver
4. Embodiment of Microparticle Separation Method
5. Example
5-1. Analysis of Re-emission of Microparticles
5-2. Study on Separation of Microparticles with Low Voltage
5-3. Comparison between Basic Microparticle Separation Method and Microparticle Separation Method of Present Technology
5-4. Comparison of Recovery Rates
5-5. Relationship between Variation in Piezo Element and Microparticle Separation Speed Note that in the present technology, a "microparticle" broadly includes, for example, biologically relevant microparticles such as cells, microorganisms, and liposome, synthetic particles such as latex particles, gel particles, and industrial particles, and the like.

The biologically relevant microparticles include, for example, chromosomes, liposome, mitochondria, and organelle (cell organelle) forming various cells. The cells include animal cells (blood cells etc.) and plant cells. The microorganisms include, for example, bacteria such as *Escherichia coli*, viruses such as tobacco mosaic virus, and fungi such as yeast. Further, the biologically relevant microparticles may include biologically relevant polymers such as nucleic acid, protein, and complexes thereof. Moreover, the industrial particles may include, for example, organic or inorganic polymer materials, metal, and the like. The organic polymer materials include, for example, polystyrene, styrene divinylbenzene, and polymethylmethacrylate. The inorganic polymer materials include, for example, glass, silica, and magnetic materials. The metal includes, for example, gold colloid and aluminum. The shape of these microparticles is generally a spherical shape, but may be a non-spherical shape. Moreover, the size, mass, etc. of the microparticles are not specifically limited either.

1. Basic Microparticle Separation Method 1-1. Entire Configuration of Microparticle Separation Device FIG. 1 is a view for describing a configuration of a microparticle separation device A suitable for implementation of a microparticle separation method according to an embodiment of the present technology.

Moreover, FIGS. 2 to 4 are views for describing an outline of a configuration of a microchip 1a mounted on the microparticle separation device A. FIG. 2 is an upper view, FIG. 3 is a perspective view, and FIG. 4 is a sectional view corresponding to a Q-Q section of FIG. 2.

The microparticle separation device A includes the microchip 1a, an irradiator 21, a detector 22, and a driver 23. A main flow path 15 in which liquid (sample liquid) containing microparticles targeted for analysis flows is formed at the microchip 1a (see FIG. 2). Moreover, an actuator 31 is arranged on a surface of the microchip 1a (see FIG. 3).

The irradiator 21 is configured to irradiate, with light (excitation light), the microparticles flowing in the main flow path 15 of the microchip 1a. The irradiator 21 includes, for example, a light source configured to emit the excitation light, and an objective lens configured to collect the excitation light to the microparticles flowing in the main flow path 15. According to a purpose for analysis, the light source is, as necessary, selected from a laser diode, a SHG laser, a solid-state laser, a gas laser, a super luminosity LED, etc. As necessary, the irradiator 21 may have optical elements other than the light source and the objective lens.

The detector 22 is configured to detect fluorescence and scattered light generated from the microparticles by irradiation with the excitation light. The detector 22 includes, for example, a collecting lens configured to collect the fluorescence and the scattered light generated from the microparticles, and a detection instrument. For example, a PMT, a photodiode, a CCD, or a CMOS is used as the detection instrument. As necessary, the detector 22 may have optical elements other than the collecting lens and the detection instrument.

The fluorescence detected by the detector 22 may be fluorescence generated from the microparticles themselves and fluorescence generated from a fluorescent substance etc. labeled with the microparticles. Moreover, the scattered light detected by the detector 22 may be various types of scattered light such as forward-scattered light, side-scattered light, Rayleigh scattering light, and Mie scattering light.

1-2. Outline of Configuration of Microchip

The configuration of the microchip 1a will be described in detail with reference to FIGS. 2 to 4. The sample liquid containing the microparticles is introduced into a sample liquid flow path 12 through a sample liquid inlet 11. Moreover, sheath liquid is introduced through a sheath liquid inlet 13. The sheath liquid introduced through the sheath liquid inlet 13 is sent with the sheath liquid being branched into two sheath liquid flow paths 14. The sample liquid flow path 12 and the sheath liquid flow paths 14 are joined into the main flow path 15. A sample liquid laminar flow sent in the sample liquid flow path 12 and sheath liquid laminar flows sent in the sheath liquid flow paths 14 are joined in the main flow path 15, and a sheath flow is formed such that the sample liquid laminar flow is sandwiched between the sheath liquid laminar flows (see FIG. 5C as described later).

A reference numeral 15a in the figure indicates a detection region irradiated with the excitation light by the irradiator 21 and targeted for detection of the fluorescence and the scattered light by the detector 22. The microparticles are sent to the detection region 15a in a state in which the microparticles are formed in line in the sheath flow formed in the main flow path 15, and are irradiated with the excitation light from the irradiator 21.

The main flow path 15 is branched into three flow paths on the downstream of the detection region 15a. A configuration of a branched portion of the main flow path 15 is illustrated in FIGS. 5A to 5C. The main flow path 15 communicates, on the downstream of the detection region 15a, with three branched flow paths including a separation flow path 16 and disposal flow paths 17. Of these flow paths, the separation flow path 16 is a flow path into which microparticles (hereinafter referred to as "target particles") determined as satisfying predetermined optical characteristics by the driver 23 are extracted. On the other hand, microparticles (hereinafter referred to as "non-target particles") determined as not satisfying the predetermined optical characteristics by the driver 23 are not extracted into the separation flow path 16, but flow into any one of the two disposal flow paths 17.

Extracting of the target particles into the separation flow path 16 is performed in such a manner that negative pressure is generated in the separation flow path 16 by the actuator 31 and the sample liquid and the sheath liquid containing the target particles are sucked into the separation flow path 16 by means of the negative pressure. The actuator 31 is a piezoelectric element such as a piezo element. The actuator 31 is arranged in contact with the surface of the microchip 1a, and is arranged at a position corresponding to the separation flow path 16. More specifically, the actuator 31 is arranged at a position corresponding to a pressure chamber 161 provided as a region where an inner space of the separation flow path 16 is expanded (see FIGS. 3 and 4).

An inner space of the pressure chamber 161 is expanded in a planar direction (a width direction of the separation flow path 16) as illustrated in FIG. 2, and is also expanded in a sectional direction (a height direction of the separation flow path 16) as illustrated in FIG. 4. That is, the separation flow path 16 is expanded in the width direction and the height direction in the pressure chamber 161. In other words, the separation flow path 16 is formed such that a section perpendicular to a flow direction of the sample liquid and the sheath liquid is expanded in the pressure chamber 161.

The actuator 31 is configured to generate stretching force in accordance with a change in applied voltage, thereby changing pressure in the separation flow path 16 through the surface (a contact surface) of the microchip 1a. When a flux occurs in the separation flow path 16 in association with the pressure change in the separation flow path 16, the inner volume of the separation flow path 16 changes simultaneously. The inner volume of the separation flow path 16 changes until reaching a volume defined by the amount of displacement of the actuator 31 corresponding to the applied voltage. More specifically, in a state in which the actuator 31 is stretched by voltage application, the actuator 31 presses a displacement plate 311 (see FIG. 4) forming the pressure chamber 161, and maintains a small volume of the pressure chamber 161. Then, when the applied voltage lowers, the actuator 31 causes the displacement plate 311 to contract to generate the negative pressure in the pressure chamber 161.

For efficiently transmitting the stretching force of the actuator 31 into the pressure chamber 161, the surface of the microchip 1a is preferably recessed at the position corresponding to the pressure chamber 161, and the actuator 31 is preferably arranged in such a recess, as illustrated in FIG. 4. With this configuration, the displacement plate 311 as the contact surface for the actuator 31 can be thinned, and can be easily displaced by a change in pressing force in association with stretching/contraction of the actuator 31 to change the volume of the pressure chamber 161.

In FIGS. 4 and 5A to 5C, a reference numeral 156 indicates a communication port of the separation flow path 16 for the main flow path 15. The target particles sent in the sheath flow formed in the main flow path 15 are extracted into the separation flow path 16 through the communication port 156. The communication port functions as an orifice.

For facilitating extracting of the target particles from the main flow path 15 into the separation flow path 16, the communication port 156 preferably opens at a position corresponding to the sample liquid laminar flow S in the sheath flow formed in the main flow path 15, as illustrated in FIG. 5C. The shape of the communication port 156 is not specifically limited, and a shape in which an opening is formed at a planar surface as illustrated in FIG. 5A or a shape in which an opening is formed by cutting out flow path walls of the two disposal flow paths 17 as illustrated in FIG. 5B may be employed, for example.

The microchip 1*a* may be configured such that substrate layers provided with the main flow path 15 etc. are bonded to each other. Formation of the main flow path 15 etc. at the substrate layers may be performed using a die by injection molding of thermoplastic resin. Well-known plastic as typical microchip materials such as polycarbonate, polymethylmethacrylate resin (PMMA), cyclic polyolefin, polyethylene, polystyrene, polypropylene, and polydimethylsiloxane (PDMS) can be employed as the thermoplastic resin.

An example where the target particles are directly extracted into the pressure chamber has been described above, but a target microparticle trapping chamber arranged in series between the separation flow path 16 and the pressure chamber 161 and having an expanded inner space may be provided in a variation. Multiple pressure chambers and multiple trapping chambers may be arranged. In this case, the pressure chambers and the trapping chambers are connected in series in the separation flow path 16, and the trapping chambers are arranged closer to the main flow path 15 with respect to the pressure chambers.

1-3. Basic Microparticle Separation Operation

Next, basic microparticle separation operation according to an embodiment of the present technology will be described along with operation of the microparticle separation device A.

When a user starts analysis, the microparticle separation device A drives a pump to send the sample liquid and the sheath liquid to the sample liquid inlet 11 and the sheath liquid inlet 13 of the microchip 1*a*. Accordingly, in the main flow path 15, the sheath flow is formed such that the sample liquid laminar flow is sandwiched between the sheath liquid laminar flows.

The microparticles are sent to the detection region 15*a* with the microparticles being arranged in line with the sheath flow, and are irradiated with the excitation light from the irradiator 21. The fluorescence and the scattered light generated from the microparticles by irradiation with the excitation light are detected by the detector 22, and are converted into electrical signals. The electrical signals are output to the driver 23.

The driver 23 determines the optical characteristics of the microparticles on the basis of the input electrical signals. In a case where the microparticle is determined as the target particle, the driver 23 generates, for the actuator 31, a drive signal for acquiring such a microparticle after a time (a delay time) until the target microparticle moves from the detection region 15*a* to the branched portion has elapsed, as illustrated in FIGS. 6A and 6B. At this point, the actuator 31 may be, if necessary, driven through an amplifier.

Specifically, in a case where the actuator 31 is the piezo element, the driver 23 applies voltage leading to piezo contraction to generate the negative pressure in the pressure chamber 161, and in this manner, the target particles are extracted from the main flow path 15 into the separation flow path 16.

On the other hand, in a case where the microparticle is determined as the non-target particle, the driver 23 generates, for the actuator 31, a non-acquisition drive signal, and subsequent microparticle optical characteristic determination is performed, as illustrated in FIGS. 6C and 6D. Note that the actuator 31 having received the non-acquisition drive signal does not operate.

The driver 23 repeats determination of the microparticle optical characteristics and output of the drive signal to the actuator 31 until completion of analysis (see FIGS. 6E to 6F), and only the target particles are stored in the separation flow path 16 (see FIG. 6F). After completion of analysis, the target particles sorted into the separation flow path 16 are recovered by the user. Note that the non-target particles having flowed into the disposal flow paths 17 may be stored in the disposal flow paths 17, or may be discharged to the outside.

As illustrated in FIG. 7A, the target microparticle drawn into the separation flow path 16 is extracted into the pressure chamber 161. In the figure, a reference character P indicates the target microparticle extracted into the pressure chamber 161, and a reference numeral 162 indicates an intake port of the pressure chamber 161 for the target microparticle P. The flow, which contains the target microparticle P, of the sample liquid and the sheath liquid turns into a jet flow (jet) when flowing into the pressure chamber 161 having the expanded inner space, and is separated from a flow path wall surface (see arrows in FIG. 7A). Thus, the target microparticle P moves away from the intake port 162, and is extracted deep into the pressure chamber 161.

For drawing the target microparticle from the main flow path 15 into the pressure chamber 161, the increment of the volume of the pressure chamber 161 is greater than the volume (see FIG. 4) of the separation flow path 16 from the communication port 156 to the intake port 162. Moreover, the increment of the volume of the pressure chamber 161 is at such a level that sufficient negative pressure is generated to separate the flow, which contains the target microparticle P, of the sample liquid and the sheath liquid from the flow path wall surface at the intake port 162. The driver 23 output, to the actuator 31, a piezo contraction signal with a voltage width corresponding to the volume increment.

The length of the separation flow path 16 from the communication port 156 to the intake port 162 may be designed shorter. A shorter length from the communication port 156 to the intake port 162 results in a smaller volume of the separation flow path 16 from the communication port 156 to the intake port 162, and therefore, the increment of the volume of the pressure chamber 161 for drawing the target microparticle from the main flow path 15 into the pressure chamber 161 can be decreased. As a result, the width of the voltage applied to the actuator 31 can be decreased, leading to efficient separation operation. In other words, the particles can be trapped by generation of the jet flow with low drive voltage.

As described above, the target microparticle P is extracted deep into the pressure chamber 161 having the expanded inner space in the separation flow path 16. This can prevent the target microparticle P from flowing out of the pressure chamber 161 toward the main flow path 15 again even in a case where the inner pressure of the separation flow path 16 is inverted to positive pressure. That is, even in a case where the inside of the separation flow path 16 is brought into the positive pressure as illustrated in FIG. 7B, the sample liquid and the sheath liquid broadly flow out of the vicinity of the intake port 162, and for this reason, the amount of movement of the target microparticle P itself extracted to a position apart from the intake port 162 is small. Thus, the target microparticle P is held in the pressure chamber 161 without flowing out again.

1-4. Basic Drive Signal

A basic waveform (a basic drive signal when the target microparticle is acquired) of the voltage applied to the actuator 31 from the driver 23 will be described. The waveform of the voltage applied to the actuator 31 is a pseudo-step waveform.

A pulse waveform amplitude is set such that a sufficient volume increment is provided at the pressure chamber 161 to draw the target microparticle from the main flow path 15 into the pressure chamber 161 and separate the flow, which contains the target microparticle P, of the sample liquid and the sheath liquid from the flow path wall surface at the intake port 162. Moreover, the decrement of a voltage value for a single waveform is also set to satisfy similar conditions.

In the present technology, the target particles in the main flow path 15 are extracted into the pressure chamber 161 having the expanded inner space in the separation flow path 16, and therefore, this can prevent the target particles drawn into the separation flow path 16 from flowing out again. Thus, sorting of the target particles can be stably performed. Moreover, in the present technology, even if the inside of the separation flow path 16 is brought into the positive pressure, the target particles can be held in the pressure chamber 161. Thus, control of drive voltage for the actuator 31 can be performed under robust conditions. Further, in the present technology, driving of the actuator 31 can be performed with voltage with a pulse waveform. Thus, separation of the target particles can be performed without quantity limitations regardless of a movable range of the actuator 31.

2. Microparticle Separation Program

A microparticle separation program for executing the above-described operation is stored in the driver 23 of the microparticle separation device A described above.

The program is stored/held in a hard drive, and is loaded in a memory under the control of a CPU and an OS to execute the above-described separation operation. The program may be recorded in a computer-readable recording medium. Specifically, as long as the recording medium is the computer-readable recording medium, the recording medium includes, but not limited to, discoid recording media such as a flexible disk and a CD-ROM, for example. Alternatively, a tape-type recording medium such as a magnetic tape may be used. Alternatively, a configuration may be employed, in which part of processing is implemented by hardware such as a digital signal processor (DSP), an application specific integrated circuit (ASIC), a programming logic device (PLD), or a field-programmable gate array (FPGA) and high-speed processing is performed in cooperation with the software program.

The microparticle separation program is configured to cause a computer to execute, in the microparticle separation microchip, separating and extracting the microparticles in the liquid flowing in the main flow path into the pressure chamber communicating with the main flow path by generation of the negative pressure in the pressure chamber, discharging the liquid from the pressure chamber to the main flow path by generation of the positive pressure equal to or lower than the total absolute value of the negative pressure generated in the pressure chamber, and controlling the negative pressure or the positive pressure at the time interval of detection of the microparticle in the liquid flowing in the main flow path.

Specifically, the way to control the negative pressure or the positive pressure at the time interval of detection of the microparticle will be described in detail at a drive waveform section in a later-described embodiment of the microparticle separation method.

3. Microparticle Separation System

Hereinafter, a microparticle separation system of an embodiment of the present technology will be described with reference to FIG. 8.

3-1. Entire Configuration of Driver

FIG. 8 is a diagram for describing a driver of the microparticle separation system. Note that in the present embodiment, the same reference numerals are used to represent elements corresponding to the components of the microparticle separation device A illustrated in FIG. 1. As illustrated in FIG. 8, the driver 23 has multiple circuits 2302 to 2309 connected to a bus 2301.

Specifically, a circuit indicated by a reference numeral 2302 in the figure is an analog-digital conversion circuit 2302. Moreover, a circuit indicated by a reference numeral 2303 is an event detection circuit 2303. Further, a circuit indicated by a reference numeral 2304 is an arrival time calculation circuit 2304. In addition, a circuit indicated by a reference numeral 2305 is a gating circuit 2305. Moreover, a circuit indicated by a reference numeral 2306 is an output queue circuit 2306. Further, a circuit indicated by a reference numeral 2307 is an output timing generation circuit 2307. In addition, a circuit indicated by a reference numeral 2308 is an output signal generation circuit 2308. Moreover, a circuit indicated by a reference numeral 2309 is a micro processing unit (MPU) 2309. Note that the analog-digital conversion circuit 2302 is indicated as "A/D" in the figure.

Moreover, as illustrated in FIG. 8, the driver 23 has a clock counter 2310. The clock counter 2310 is connected to the event detection circuit 2303, the arrival time calculation circuit 2304, the gating circuit 2305, the output queue circuit 2306, the output timing generation circuit 2307, and the output signal generation circuit 2308.

Further, as illustrated in FIG. 8, the driver 23 has a personal computer connection input/output interface circuit (PC I/O) 2311 connected to the MPU 2309, and a control PC 2312 connected to the PC I/O 2311.

In addition, as illustrated in FIG. 8, the driver 23 has a digital-analog conversion circuit 2313 connected to the output signal generation circuit 2308. Note that the digital-analog conversion circuit 2313 is indicated as "D/A" in the figure.

3-2. Details of Driver

Analog-Digital Conversion Circuit

The analog-digital conversion circuit 2302 is a circuit at a subsequent stage (on an output side) of the detector 22 (see FIG. 1), and is connected to the detector 22. Moreover, multiple analog-digital conversion circuits 2302 are arranged. In this cases, the same number of analog-digital conversion circuits 2302 as the number of channels (Ch in FIG. 13) of the detector 22 may be arranged corresponding to multiple types of light (wavelength regions) detected by the detector 22. Alternatively, the same number of analog-digital conversion circuits 2302 as the number of sensors of the detector 22 may be arranged.

An electrical signal output from the detector 22 and corresponding to an associated one of the analog-digital conversion circuits 2302 is input to the associated one of the analog-digital conversion circuits 2302. The electrical signal is an analog signal obtained in such a manner that the light (the fluorescence and the scattered light) detected by the detector 22 is photoelectrically converted by the detector 22. Moreover, each analog-digital conversion circuit 2302 converts the input electrical signal from the analog signal into a digital signal. Further, each analog-digital conversion circuit 2302 outputs, to a subsequent stage, the electrical signal converted into the digital signal.

Event Detection Circuit

The event detection circuit 2303 is a circuit at the subsequent stage of each analog-digital conversion circuit 2302, and is connected to each analog-digital conversion circuit 2302.

The electrical signal output from each analog-digital conversion circuit 2302 is input to the event detection circuit 2303. Then, the event detection circuit 2303 uses a specific signal of the input electrical signals as a trigger signal for recognizing the microparticle. That is, in a case where the value of the trigger signal satisfies predetermined conditions, the event detection circuit 2303 recognizes that each electrical signal is detected from the microparticle. Note that the trigger signal may be, but not limited to, an electric signal of light (e.g., the forward-scattered light) with the highest intensity among the multiple types of light detected by the detector 22.

Moreover, as illustrated in FIG. 9, the event detection circuit 2303 reads the waveform of each input electrical signal, thereby calculating the width, height, and area of the read waveform. Further, the event detection circuit 2303 uses, e.g., each calculated waveform value to produce an event data packet showing an association of each electrical signal with the corresponding single microparticle as illustrated in FIG. 10. This event data packet is one example of measurement data for a single microparticle. Then, the event detection circuit 2303 outputs the produced event data packet to a subsequent stage.

The event data packet described herein includes an item (hereinafter referred to as a "first item") for which data recording is completed upon production of the packet. Moreover, the event data packet includes an item (hereinafter referred to as a "second item") updated as processing regarding the electrical signal corresponding to the packet proceeds after production of the packet.

The first item includes, for example, the following items:

the width, height, and area of the waveform of the electrical signal;

a recognized microparticle number (an event number);

the number of the electrical signal as the trigger signal; and a trigger signal detection time.

Note that the number of the electrical signal as the trigger signal may be a channel number. Alternatively, a signal input from the clock counter 2310 may be used for recording of the trigger signal detection time. This signal may be a signal obtained in such a manner that the clock counter 2310 counts a clock signal input from a clock generation circuit (not shown) to the clock counter 2310 itself.

On the other hand, the second item includes, for example, the following items:

a time at which the microparticle needs to be extracted;

a first flag indicating whether or not extracting of the microparticle is to be performed; and a second flag indicating whether or not extracting of the microparticle is to be performed.

Note that the first flag is a flag set by the gating circuit 2305. On the other hand, the second flag is a flag set by the output queue circuit 2306. These first and second flags are basically set to 1 or 0, and may be provided for determining whether or not extracting of the corresponding microparticle is to be performed. More details of each flag will be described later.

Arrival Time Calculation Circuit

As illustrated in FIG. 8, the arrival time calculation circuit 2304 is a circuit at the subsequent stage of the event detection circuit 2303, and is connected to the event detection circuit 2303.

The event data packet output from the event detection circuit 2303 is input to the arrival time calculation circuit 2304. Then, on the basis of the input event data packet, the arrival time calculation circuit 2304 calculates, as the time at which the microparticle needs to be extracted in the second item, an arrival time at which the microparticle (the target particle) arrives at the communication port 156. The "time at which the microparticle needs to be extracted" will be replaced with the "arrival time" in description below. The arrival time calculation circuit 2304 records the arrival time calculated by such calculation in the event data packet, and after recording, outputs the event data packet to a subsequent stage.

Calculation of the arrival time may be performed in such a manner that a necessary time (the delay time) until the target microparticle reaches the communication port 156 from the detection region 15*a* is added to the trigger signal detection time of the second item. Alternatively, the arrival time may be calculated as a clock counter value.

Gating Circuit

The gating circuit 2305 is a circuit at the subsequent stage of the event detection circuit 2303, and is connected to the event detection circuit 2303.

The event data packet output from the event detection circuit 2303 is input to the gating circuit 2305. Then, the gating circuit 2305 sets the first flag for the input event data packet. Further, the gating circuit 2305 outputs the event data packet to a subsequent stage after setting of the first flag.

Setting of the first flag may be performed on the basis of a threshold set in advance for a parameter of each electrical signal in the event data packet. In this case, the threshold may be at least one of the width, height, or area of the waveform. Moreover, in a case where the parameter satisfies the threshold, the value of the first flag may be set to a value (e.g., "1") indicating that extracting of the microparticle is to be performed. On the other hand, in a case where the parameter does not satisfy the threshold, the value of the first flag may be set to a value (e.g., "0") indicating that extracting of the microparticle is not to be performed.

Alternatively, the threshold may be a range set in advance by gating. Gating described herein is the processing of enclosing and specifying a range corresponding to the target microparticle on a distribution map showing microparticle characteristic distribution for a microparticle group. Such gating is performed before the start of target microparticle extracting operation. Note that the distribution map may be produced by a graphical user interface (GUI) on the control PC 2312. Alternatively, gating may be performed by the gating circuit 2305.

FIG. 11A herein shows a gating result in the form of a histogram chart as one example of the distribution map. This histogram chart indicates the parameter for the horizontal axis, and indicates the number of particles for the vertical axis. The parameter in the figure is the area of the waveform of the electrical signal corresponding to a channel No. 1 (Ch1), but other parameters may be used. Moreover, a rectangular frame in the figure is a gate specifying the range corresponding to the target particle, and such a range may be used as the threshold for setting the first flag.

On the other hand, FIG. 11B shows a gating result in the form of a two-dimensional (2D) chart as one example of the distribution map. In this 2D chart, different parameters are assigned to the horizontal axis and the vertical axis. In the figure, the parameter for the horizontal axis is the area of the waveform of the electrical signal corresponding to a channel No. 2 (Ch2), and the parameter for the vertical axis is the area of the waveform of the electrical signal corresponding to a channel No. 3 (Ch3). However, other parameters than the areas of the waveforms of both electrical signals may be used. Moreover, a rectangular frame in the figure is a gate specifying the range corresponding to the target particle, and such a range may be used as the threshold for setting the first flag.

Output Queue Circuit

Returning to FIG. 8, the output queue circuit 2306 is a circuit at the subsequent stage of the arrival time calculation circuit 2304 and the gating circuit 2305, and is connected to the arrival time calculation circuit 2304 and the gating circuit 2305.

The event data packet output from the arrival time calculation circuit 2304 and the event data packet output from the gating circuit 2305 are input to the output queue circuit 2306. Then, the output queue circuit 2306 integrates (synthesizes) both input event data packets showing the same microparticle, i.e., the same event number, into a single event data packet. In this integrated event data packet, both of the delay time and the first flag are written. Note that integration of the event data packets may be performed at either one of the arrival time calculation circuit 2304 or the gating circuit 2305 via communication between both circuits 2304, 2305. Alternatively, the arrival time calculation circuit 2304 and the gating circuit 2305 may be connected in series.

Moreover, the output queue circuit 2306 sorts sequentially-input different microparticle event data packets in time order, starting with the earliest arrival time included in the event data packet. In this case, the event data packets input to the output queue circuit 2306 and standing by for output of the drive waveform for extracting the corresponding microparticle are defined as an "output queue." The output queue is updated according to input of a new event data packet to the output queue circuit 2306.

Further, the output queue circuit 2306 determines, according to a purity priority mode or an acquisition rate priority mode, whether or not extracting of the microparticle corresponding to each event data packet is to be performed. Note that the purity priority mode and the acquisition rate priority mode are an operation mode of the driver 23 selectively set in advance before the start of the microparticle extracting operation. Setting of such a mode may be performed by the control PC 2312 via various user interfaces.

The purity priority mode described herein is a mode that in a case where the target microparticle and the non-target microparticle flow in close to each other and there is a high probability that both particles are trapped together, such a target microparticle is purposefully taken as the "non-target microparticle (non-acquisition)" to enhance a trapped microparticle purity. That is, in the case of setting the purity priority mode, the target particles close to the non-target particles are not extracted, but are disposed.

On the other hand, the acquisition rate priority mode is a mode that in a case where the target microparticle and the non-target microparticle flow in close to each other and there is a high probability that both particles are trapped together, both particles are acquired together to increase the number of acquired particles even if the trapped microparticle purity is lowered.

Then, the output queue circuit 2306 sets the second flag on the basis of a determination result on the presence or absence of extracting of the microparticle according to the set mode. At this point, in the case of determining that extracting of the microparticle is to be performed, the output queue circuit 2306 may set the second flag to "1." On the other hand, in the case of determining that extracting of the microparticle is not to be performed, the output queue circuit 2306 may set the second flag to "0." Note that flag setting is not limited to such a form.

Further, the output queue circuit 2306 writes, in a memory, application timing of the drive waveform needing to be applied to the actuator 31. This memory may be a random access memory (RAM). Moreover, the memory may be connected to the bus 2301, or may be built in the circuit of the driver 23 or the control PC 2312. Further, when the application timing is written, the set values of the first flag and the second flag may be referred. In this case, in a case where both flags are set to the value indicating execution of extracting, the application timing may be written such that the corresponding microparticle is extracted. Further, the drive waveform may be the drive voltage.

The output queue circuit 2306 described herein writes, in the memory, application timing of a falling waveform portion and application timing of a rising waveform portion in the case of applying the drive waveform. Examples of the falling waveform portion and the rising waveform portion are illustrated in FIG. 12.

A first rising waveform portion shows a shape connecting a first flat portion to a back end of the falling waveform portion. The falling waveform portion shows a shape connecting a second flat portion to a back end of a second falling waveform portion, and the rising waveform portion shows a shape connecting a third flat portion to a back end of a second rising waveform portion. A signal of the second rising waveform portion is controlled such that the third flat portion has a lower signal value than that of the first flat portion.

The waveform illustrated in FIG. 12 is one example with the clearly-illustrated flat portions, and may be the pulse waveform. Alternatively, although details will be described later, the waveform may be a step waveform of FIG. 16, for example. Furthermore, the waveform may be an undershoot-containing step waveform in which an undershoot flat portion is included as in FIG. 12.

The falling waveform portion is applied for generating the negative pressure in the inner space of the separation flow path 16 (the pressure chamber 161) to fetch the microparticle. Generation of the negative pressure is performed in such a manner that the actuator 31 generates the force of deforming the inner space in the direction of increasing the volume of the inner space. As described above, the increase in the volume can be produced by retracting the displacement plate 311 to increase the inner volume of the pressure chamber 161. Alternatively, in a case where the actuator 31 is the piezo element, the falling waveform portion may be a waveform for reducing the drive voltage applied to the stretched piezo element to contract the piezo element.

On the other hand, the rising waveform portion is applied for applying the positive pressure to return the actuator 31 from a state in which the inner space of the separation flow path 16 (the pressure chamber 161) is deformed for generation of the negative pressure. Such returning is performed in such a manner that the force of deforming the inner space in the direction of decreasing the volume of the inner space is generated at the actuator 31. As described above, such force may be the force of strengthening pressing of the displacement plate 311 to decrease the inner volume of the pressure chamber 161. Alternatively, in a case where the actuator 31 is the piezo element, the rising waveform portion may be a waveform for increasing the drive voltage applied to the contracted piezo element to stretch the piezo element.

Moreover, in a case where the application timing of the falling waveform portion and the rising waveform portion is written in the memory, the output queue circuit 2306 calculates the application timing on the basis of a time interval (in other words, an event time interval) between the earlier application timing of the falling waveform portion and the later application timing of the rising waveform portion in a temporal sequence.

Output Timing Generation Circuit

As illustrated in FIG. 8, the output timing generation circuit 2307 is connected to the output queue circuit 2306. The output timing generation circuit 2307 reads, from the RAM, the arrival time of the event data packet located at the top of the output queue written in the RAM by the output queue circuit 2306. Then, the output timing generation circuit 2307 compares the read arrival time with the value of the signal from the clock counter 2310, thereby generating an output timing signal at the arrival time. The output timing signal described herein is a signal for assigning output timing of the drive waveform. The output timing generation circuit 2307 outputs the generated output timing signal to a subsequent stage. Further, the output timing generation circuit 2307 may transmit, after output of the output timing signal, a completion signal to the output queue circuit 2306, thereby prompting the output queue circuit 2306 to update the output queue.

Output Signal Generation Circuit

The output signal generation circuit 2308 is a circuit at the subsequent stage of the output timing generation circuit 2307, and is connected to the output timing generation circuit 2307.

The output timing signal output from the output timing generation circuit 2307 is input to the output signal generation circuit 2308. Then, the output signal generation circuit 2308 generates a drive waveform (an output signal) corresponding to the input output timing signal, thereby outputting the drive waveform to a subsequent stage. Further, the output signal generation circuit 2308 updates, after output of the drive waveform, a step counter and an output status signal. Note that the output status signal is a signal indicating a waveform stopping/outputting (outputtable (enable)/non-outputtable (disable)) state.

The step counter described herein indicates a stepwise output level of the drive waveform. In other words, the step counter indicates the value of a variable from a reference value of the drive waveform varying in a stepwise manner as the number of times of application of the drive waveform increases. An output difference for each level difference corresponding to a single step of the step counter is constant. The step counter and the output status signal may be input to the output queue circuit 2306 and the output timing generation circuit 2307, and may be utilized for the processing of each circuit 2306, 2307.

Digital-Analog Conversion Circuit

The drive waveform output from the output signal generation circuit 2308 is input to the digital-analog conversion circuit 2313. Then, the digital-analog conversion circuit 2313 converts the input drive waveform from the digital signal into an analog signal, and outputs the analog signal to a drive circuit of the actuator 31.

The entire configuration of the microparticle separation system includes the microparticle separation microchip, the microchip mounting portion on which the microparticle separation microchip is mounted, the light irradiator configured to irradiate, with the light, the microparticle detection region of the microparticle separation microchip, the detector configured to detect the scattered light and/or the fluorescence emitted from the microparticles by light irradiation, and the pressure chamber controller configured to bring the inside of the pressure chamber into the negative pressure or the positive pressure.

The pressure chamber controller is controlled by the microparticle separation program such that the microparticles are separated and extracted into the pressure chamber by generation of the negative pressure in the pressure chamber or the positive pressure equal to or lower than the total absolute value of the negative pressure generated in the pressure chamber is generated to discharge the liquid from the pressure chamber. Moreover, the negative pressure or the positive pressure is controlled depending on the time interval of detection of the microparticle.

4. Embodiment of Microparticle Separation Method

Next, an embodiment of the microparticle separation method according to an embodiment of the present technology will be described along with operation of the microparticle separation device, the microparticle separation device with the driver 23 of FIG. 8 being applied to the microparticle separation method. The microparticle separation method in the present embodiment is a method in which for application of the pseudo-step waveform to the actuator 31, application of the falling waveform portion and application of the rising waveform portion are separately controlled.

Embodiments of the present technology can provide an arrangement in which a negative pressure created in a pressure chamber by an actuator is adapted in accordance with a number of microparticles in a sequence of microparticles to be extracted. According to the example embodiments explained below, the generating the change of the negative pressure to extract each of the plurality of microparticles in the sequence of microparticles comprises changing the negative pressure by a different amount in accordance with a separation between the microparticle being extracted and a next of the microparticles in the sequence of microparticles. As will be explained, by changing dynamically the amount of change in the negative pressure in the pressure chamber in accordance with which of the microparticles in the sequence of microparticles is being extracted, a greater number of the microparticles in a sequence can be extracted, thereby improving a yield of a sample of the microparticles.

The microparticles are separated from each other in a sequence by time (Tp), dependent on a flow rate of the sample (sheath liquid), which is less than a maximum time (Tmax). The maximum time Tmax may be set by a user or may be a system parameter determined for example as a response to of the actuator to generate a negative pressure and return to a neutral or un-pressurized state determine in accordance with a reference voltage of a drive control voltage of an actuator. A negative pressure step required to extract or capture each microparticle from a main flow 15 into a flow path 16 to the pressure chamber via a communication port 156 is adapted with respect to a position of the microparticle in the sequence of microparticles and in accordance with a relative time to a next microparticle of the sequence of one or more microparticles. As a result a greater number of microparticles can be captured improving a yield of the microparticle separation.

As will be appreciated there is a maximum negative pressure which the actuator can generate within the pressure chamber Pmax. However the microparticles are captured by creating a differential negative pressure as a microparticle is located in the main flow at a point proximate the communication port 156 where it can be sucked into the pressure chamber, after which the pressure needs to be held at this value to ensure that the microparticle does not again flow out into the main path to be lost. As such there would be a limit on a number of microparticles which can be captured based on the maximum negative pressure which can be created in the pressure chamber and a step size in the differential negative pressure increase. However embodiments of the present technology are configured to adapt the negative differential pressure generated in the pressure chamber in accordance with a relative order of a microparticle in a sequence of microparticles separated by less than Tmax so that more of the microparticles in the sequence can be extracted into the sample flow.

As will be appreciated, in order to ensure as large a number of microparticles in a sequence are extracted, then under predetermined conditions the pressure in pressure chamber is increased depending on a time to a next of the microparticles in the sequence (Tset), thereby providing a greater difference between a resulting increased pressure and the maximum negative pressure. More generally, if a time between microparticles is greater than a stability time (Tstable), then the system can be configured to control the pressure in the pressure chamber to rise back to the un-pressurized state or that produced with the reference voltage.

Example embodiments will not be described with reference to FIGS. 13 to 35.

The microparticle separation method in the present embodiment may be according to flowcharts of FIGS. 13 and 14 visualizing one example of an algorithm for realizing this method. In this embodiment, FIGS. 13 and 14 are the flowcharts mainly showing operation of the output queue circuit 2306. More specifically, FIG. 13 shows entire operation, and FIG. 14 shows calculation of rising timing, i.e., the application timing, of the rising waveform portion. Hereinafter, the flowchart of each figure will be sequentially described.

Entire Operation

In the flowchart of FIG. 13, the following first to third types of processing are separately performed in parallel.

First Processing

In the first processing, the presence or absence of input of an event (the event data packet) is first determined at a step 181-1 (S181-1). For such determination, the event data packet input from a former-stage circuit (e.g., the arrival time calculation circuit 2304 and the gating circuit 2305) is utilized. Then, in a case where a positive determination result is obtained at the step 181-1 (S181-1), the processing proceeds to a step 181-2 (S181-2). In a case where a negative determination result is obtained, the step 181-1 (S181-1) is repeated.

Subsequently, at the step 181-2 (S181-2), the new event determined as "input" at the step 181-1 (S181-1) is added to the output queue, and in this manner, the output queue is updated.

Finally, at a step 181-3 (S181-3), re-evaluation on whether or not the microparticle is to be extracted (acquisition/non-acquisition) is made on the basis of the output queue updated at the step 181-2 (S181-2), and the processing returns to the step 181-1 (S181-1). A reason for using a phrase "re-evaluation" herein is that evaluation at this step corresponds to the processing of re-evaluating the event (the already-evaluated event to which the second flag is set) already included in the output queue. In the case of the purity priority, there is a probability that the event to be added to the output queue later is close to the previously-added event, and for this reason, the processing of this step is effective.

[Second Processing] (Falling Timing)

In the second processing, falling timing of the falling waveform portion for the event (the target particle) to be acquired subsequently is first, at a step 182-1 (S182-1), written in the memory (the RAM in FIG. 13). This written falling timing is referred by the output timing generation circuit 2307.

Subsequently, at a step 182-2 (S182-2), it is determined whether or not falling trigger output of the falling waveform portion has been completed. The "falling trigger output" described herein indicates that the output timing of the falling waveform portion generated by the output timing generation circuit 2307 is output to the output signal generation circuit 2308. For determination at this step, the completion signal for notifying completion of the falling trigger output input from the output timing generation circuit 2307 is utilized.

Finally, at a step 182-3 (S182-3), the event for which the falling trigger output has been completed is deleted from the output queue to update the output queue, and then, the processing returns to the step 182-1 (S182-1).

[Third Processing] (Rising Timing)

In the third processing, at a step 183-1 (S183-1), the rising timing of the rising waveform portion is first calculated.

Subsequently, at a step 183-2 (S183-2), the rising timing calculated at the step 183-1 (S183-1) is written in the memory (the RAM in FIG. 18). This written rising timing is referred by the output timing generation circuit 2307.

Subsequently, at a step 183-3 (S183-3), it is determined whether or not rising trigger output of the rising waveform portion has been completed. The "rising trigger output" described herein indicates that the output timing signal of the rising waveform portion generated by the output timing generation circuit 2307 is output to the output signal generation circuit 2308. For determination at this step, the completion signal for notifying completion of the rising trigger output input from the output timing generation circuit 2307 is utilized. Then, in a case where a positive determination result is obtained at the step 183-3 (S183-3), the processing returns to the step 183-1 (S183-1). In a case where a negative determination result is obtained, the processing repeats the step 183-3 (S183-3).

The flowchart of FIG. 14 shows the step 183-1 (S183-1) of FIG. 13, i.e., details of calculation of the rising timing.

In the flowchart of FIG. 14, it is first, at a step 191 (S191), determined whether or not the value of the step counter, described above, is greater than 0. Then, in a case where a positive determination result is obtained at the step 191 (S191), the processing proceeds to a step 192 (S192). In a case where a negative determination result is obtained, the processing returns to the step 191 (S191).

The case where the negative determination result is obtained at the step 191 (S191) as described herein is a case where the value of the step counter is 0 as illustrated in FIG. 15A. This corresponds to a case where the value of the pulse waveform is a reference value (see FIG. 16). This reference value may be a hold value of the pulse waveform. Further, this hold value may be a peak hold value. In a case where the reference value is the peak hold value, the state of FIG. 15A corresponds to a state in which the maximum value of the drive waveform is applied to the actuator 31. Further, in this case, in a case where the actuator 31 is the piezo element, the state of FIG. 15A corresponds to a state in which the piezo element shows expected maximum stretching.

Moreover, in a case where the value of the step counter is 0 as illustrated in FIG. 15A, the rising timing is not calculated (do nothing) for the corresponding event (the event to be subsequently acquired).

Subsequently, at a step 192 (S192) of FIG. 14, it is determined whether or not the value of the step counter is smaller than the maximum value. That is, this corresponds to determination on whether or not separation and extracting of the liquid, which contains the microparticles flowing in the main flow path, into the pressure chamber is smaller than the maximum amount of the liquid separable by the actuator 31. Then, in a case where a positive determination result is obtained at the step 192 (S192), the processing proceeds to a step 193 (S193). In a case where a negative determination result is obtained, the processing proceeds to a step 194 (S194).

The case where the negative determination result is obtained at the step 192 (S192) as described herein is a case where the value of the step counter is the maximum value as illustrated in FIG. 15B. That is, this is a case where separation and extracting of the liquid, which contains the microparticles flowing in the main flow path, into the pressure chamber is the maximum amount of the liquid separable by the actuator 31. In a case where the reference value is the peak hold value and the actuator 31 is the piezo element, the state of FIG. 15B corresponds to a state in which the piezo element shows the maximum contraction from the expected maximum stretching state. Note that the maximum value of the step counter in the figure is "3," but is not necessarily limited to this value.

Moreover, in a case where the value of the step counter is the maximum value as illustrated in FIG. 15B, the rising timing is forcibly calculated for the corresponding event at the step 194 (S194). The term "forcibly" means without regard to the length of time until a subsequent falling. Details of the step 194 (S194) will be described later.

Subsequently, in a case where the processing proceeds to the step 193 (S193) of FIG. 14, it is determined whether or not the time until the subsequent falling is equal to or greater than a first set value set in advance. The time until the subsequent falling as described herein uses, as a starting point, the time (in other words, a current time) of the end of application of the currently-applied falling waveform portion. Moreover, the first set value may be obtained in such a manner that a circuit operation margin time (a known time) is added to a fixed application time of the rising waveform portion. Then, in a case where a positive determination value is obtained at the step 193 (S193), the processing proceeds to the step 194 (S194). In a case where a negative determination result is obtained, the processing returns to the step 193 (S193).

The case where the negative determination result is obtained at the step 193 (S193) as described herein is a case where the time interval (the time until the subsequent falling) between the earlier falling timing and the later falling timing is short as illustrated in FIG. 15C. In this case, continuous application of the falling waveform portion is performed without calculation of the rising timing for the corresponding event.

On the other hand, in a case where the time interval between the earlier falling timing and the later falling timing is sufficiently long as illustrated in FIG. 15D, the rising timing for the corresponding event is calculated at the step 194 (S194).

Calculation of the rising timing at the step 194 (S194) may be performed in such a manner that the circuit operation margin time is added to the current time.

Alternatively, at the step 194 (S194), not only the single rising timing as in FIGS. 15B and 15D but also continuous multiple rising timings (multiple timings) may be calculated depending on the time until the subsequent falling. For example, in a case where a current step counter value is equal to or greater than "2" and the time until the subsequent falling is equal to or greater than the total value of the above-described first set value and the fixed application time of the rising waveform portion, two or more rising timings may be calculated. The number of continuous pieces of rising may vary according to the current step counter value or the total number (the number of steps) of available values taken by the step counter.

Specifically, forms are conceivable, the forms including, but not limited to, a case where a rising of 0.5 steps is made and a further rising of 1.5 steps is made as in FIG. 15E, a case where a rising of 1.5 steps is made and a further rising of 0.5 steps is made as in FIG. 15F, and a case where a rising of 0.5 steps is made, a rising of a step is subsequently made, and a further rising of 0.5 steps is made as in FIG. 15G. That is, the total number of steps until the step counter returns to 0 from the zero step may be taken.

As in the above-described rising, the total number of steps until the step counter returns to 0 from 0 may be taken for a falling.

The step counter for the falling and the rising, i.e., the negative pressure or the positive pressure, is controlled by the time interval of detection of the microparticles in the liquid flowing in the main flow path 15 by the detector 22.

For example, for the falling, if the time interval of detection of the first and second microparticles after the start of flow of the microparticles is shorter than the time interval of detection of the second and third microparticles, the first falling step counter is, e.g., 0.5 steps, and the subsequent falling step counter is, e.g., 0.2 steps. Moreover, there is the flat portion between the first falling and the subsequent falling as illustrated in FIGS. 15A to 15G or 12.

On the other hand, for the rising, if the time interval of detection of the microparticle is long, the liquid extracted into the pressure chamber 161 is discharged by the falling pressure, and therefore, a lower value than the total number of falling step counters is taken.

For example, in the above-described example, the total number of falling step counters is 0.7, and therefore, the rising step counter may take 0.4, for example.

Moreover, the rising is made in multiple steps until the step counter returns to zero.

Drive Waveform

The falling and the rising will be described with reference to FIG. 16.

According to the microparticle separation method of an embodiment of the present technology, application of the drive waveform (the drive signal) as illustrated in a time chart of FIG. 16 is performed, for example. In FIG. 16, first plot of event detections against time 200, a second plot of falling indication, corresponding to a presence of a microparticle present at the communications port 156 against time 202, and a third plot of a waveform illustrating change of a control voltage as applied to the actuator with respect to time 204. As mentioned above, the neutral or un-pressurized state of the pressure chamber corresponds to a control voltage at the reference value 206. Note that for the event detection time of FIG. 16, distribution of the time interval (a detection time interval) between the earlier event and the later event is illustrated in the form of Poisson distribution as illustrated in FIG. 17, and an interval of 200 μsec may be taken as an average time interval.

As shown in FIG. 16 by the first plot 200, a sequence of five microparticles MP1, MP2, MP3, MP4, MP5 cause five detection events, which are separated in time as a function of a flow rate of the sheath fluid by times indicated as Tp1, Tp2, Tp3, Tp4. As will be understood from the above explanation, after a delay 208 caused by a time between detection of a microparticle and a presence of the microparticle at the communication port 156, the second plot referred to as falling time 202 indicates a time at which the microparticles MP1 to MP5 need to be extracted with corresponding time between the microparticles Tp1 to Tp4.

The example embodiment illustrated by FIG. 16 can be understood from observing the third plot 204 of the actuator control voltage with respect to time. The first reference value 206 illustrated in FIG. 16 indicates a state in which the volume of the pressure chamber 161 is greatest, i.e., the maximum voltage is applied to the actuator 31.

First, when the first microparticle MP1 is detected by the detector 22, a negative voltage of Vp decreased from the reference value 206 is applied to the actuator 31 to separate and extract the first microparticle in the sequence into the pressure chamber 161. This is the first falling event. Thereafter, the inner pressure of the pressure chamber is held until detection of the second microparticle of the sequence MP2. Subsequently, when the second microparticle MP2 is detected, a negative voltage $\alpha 1Vp$, different from the first voltage Vp, is further applied to the actuator to separate and extract the second microparticle MP2. This is the second falling. The increased voltage to extract the second microparticle MP2, $\alpha 1Vp$ is determined as a function of a separation time between the first microparticles MP1 and the second microparticle MP2, which is Tp1. As will be explained below, the differential value of the negative voltage $\alpha 1Vp$ is determined as explained below based on the separation time Tp1, which therefore produces a sufficient increase in the negative pressure to extract the second microparticle MP2. The actuator control voltage is therefore determined as a function of a time interval of detection between the first and second microparticles. The length of the detection time interval between the first and second particles is therefore a calculation parameter for the level of further negative voltage required to produce suction force applied to separate and extract the second microparticle MP2 into the pressure chamber 161, and the $\alpha 1Vp$ is preferably the lowest possible negative voltage to achieve this extraction. The negative voltage for the second falling $\alpha 1Vp$ is preferably equal to or lower than the negative voltage for the first falling Vp.

After the second falling, the inner pressure of the pressure chamber is held for a predetermined time until detection of the third microparticle MP3.

Subsequently, when the third microparticle is detected, a negative voltage $\alpha 2Vp$ is further applied to the actuator to separate and fetch the third microparticle. This is the third falling. The negative voltage $\alpha 2Vp$ is controlled by the time interval of detection of the second and third microparticles. Thus, if the time interval of detection of the first and second microparticles and the time interval of detection of the second and third microparticles are different from each other, $\alpha 1Vp$ and $\alpha 2Vp$ are also different from each other.

After the third falling, the inner pressure of the pressure chamber is held as in description above.

Then, after the inner pressure of the pressure chamber after the third falling has been held for a certain time, it is assumed that no microparticle is detected. In this case, a positive voltage of Vp is applied to the actuator to discharge the liquid extracted together into the pressure chamber when microparticle separation has been performed so far. This is the first rising, that is to say a positive increase in the pressure in the pressure chamber between MP3 and Mp4 during Tp3. The positive voltage in this case is not necessarily the positive voltage Vp corresponding to the negative voltage Vp. Note that the positive voltage is equal to or lower than the total absolute value of the negative voltages $Vp+\alpha 1Vp+\alpha 2Vp$ applied so far.

After the first rising, the inner pressure of the pressure chamber is held until detection of the fourth microparticle. Therefore in some embodiments, the positive change in pressure may be determined by assessing whether the time since the last of the microparticle was captured to the time to the next of the microparticles to be captured is greater than a predetermined settling time and then controlling the increase in pressure with an increase in the drive control voltage of $\beta Vp$, where for example, $\beta=1$.

As illustrated in FIG. 16, for this examples in which MP4 is captured after MP3 and for a length of time Tp3 sufficient to allow an increase in the pressure, after the increase in the pressure in the pressure chamber by the drive control voltage of $\beta Vp$, where $\beta=1$, the negative pressure is increased by an amount $\alpha_n Vp$, where $\alpha_n>1$ in order to capture MP4. According to this example in order to ensure that a previously extracted microparticle remains in the pressure chamber and therefore extracted to the sample fluid, which is then followed by an increase in pressure, if the next microparticle to be captured follows within a predetermined time, the pressure is changed by a negative pressure to capture the following particle by an amount which exceeds that of the positive pressure increase. If the positive pressure has increased by $\beta Vp$ then the following particle is extracted with a negative pressure increase of $\beta Vp$, wherein $\beta<\alpha_n$, so that if $\beta=1$, then $\alpha_n>1$.

According to some embodiments, the positive pressure in the pressure chamber for an n-th increase in positive pressure after an increase in the negative pressure is 62 $_n Vp$, and if a time between the last microparticle extracted and the next microparticle (Tp) is greater than a total of a time for the negative pressure to fall and a hold time for the absolute pressure to prevent the extracted microparticle to flow back into the main path is less than a settling time, then the scaling factor $\beta_m=1$, else $\beta_m=1-kb(Tmax-Tp)/Tmax$.

A time for which the inner pressure of the pressure chamber needs to be held for the certain time is herein defined as a predetermined value. In a case where no microparticle is detected even when the time exceeds the predetermined value, the liquid is discharged from the pressure chamber by the positive pressure. In a case where the microparticle is detected when the time is equal to or shorter than the predetermined value, the microparticle is separated and extracted into the pressure chamber by the negative pressure.

As already explained, when the fourth microparticle MP4 is detected, a negative voltage $\alpha 3Vp$ is, as in description above, applied to the actuator to separate the fourth microparticle MP4. This is the fourth falling.

Thereafter, if no microparticle is detected even when the certain time for which the pressure of the pressure chamber is held exceeds the predetermined value, the second rising $\beta_2 Vp$ is made to discharge the liquid from the pressure chamber. The rising does not return to the reference value Vr at once, but returns to the reference value in multiple steps $\beta_2 Vp$, $\beta_3 Vp$, $\beta_4 Vp$. The pressure of the pressure chamber is held for the certain time between pressure increases Then in order to ensure that the separated microparticles remain in the pressure chamber and are extracted to the sample.

For example, as illustrated in FIG. 16, the second, third and fourth pressure increases $\beta_2 Vp$, $\beta_3 Vp$, $\beta_4 Vp$ return are as a function of Vp as a guide, and the final fourth rise $\beta_4 Vp$ is the remaining rise to the reference value. Needless to say, the number of rises to the reference value is not limited to above, and such returning is not limited to returning by Vp.

For example, instead of returning by Vp, the third rising may return by a positive voltage within a difference range between the total absolute value (Vp+$\alpha 3$Vp in FIG. 16) of the negative voltage right before the rising and the second rising. Then, the fourth rising may return to the reference value in such a manner that a positive voltage is applied to reach the total absolute value of negative voltage right before the rising.

As will be appreciated therefore embodiments, a positive change in pressure can be formed in the pressure chamber after at least one of the changes in the negative pressure by the different amounts in order to capture one of the microparticles in the sequence. The generating the positive change in pressure in the pressure chamber can include changing the positive pressure by an amount determined by an amount by which the negative pressure was changed and a time to a next one of the microparticles to be extracted. Furthermore in some example embodiments the generating the positive change in pressure in the pressure chamber comprises changing the positive pressure in one or more steps by an amount determined by an absolute negative pressure in the pressure chamber, a time since a last of the microparticles was captured and a time between the last microparticle and a next of the microparticles to be captured. In some examples, the method may also include holding an absolute pressure in the pressure chamber for a predetermined hold time set to ensure that the microparticle being extracted does not flow back into the main flow path.

Subsequently, when the pressure of the pressure chamber returns, as described above, o the reference value by application of the maximum voltage and the fifth microparticle MP5 is detected after the pressure of the pressure chamber has been held for the certain time, the negative voltage Vp is, as in description above, applied to the actuator to separate the fifth microparticle. This is the fifth falling. Then, when the certain time for which the pressure of the pressure chamber is held exceeds the predetermined value, the fifth rising is made to discharge the liquid from the pressure chamber, and the pressure of the pressure chamber returns to the reference value by reapplication of the maximum voltage.

Note that in the $\alpha 1$Vp, $\alpha 2$Vp, and $\alpha 3$Vp, a can be defined as a coefficient, and details will be described later.

As described above, according to the present embodiment, the falling waveform portion, the flat portion, and the rising waveform portion illustrated in FIG. 12 are controlled so that the returning operation by the actuator 31 can be controlled independently of the microparticle extracting operation by the actuator 31 while only the liquid can be discharged without discharging the microparticles separated and extracted into the pressure chamber. With this configuration, operation interfering with subsequent target microparticle extracting operation or leading to release of the target particles can be avoided in advance, and therefore, the rate of acquisition of the target particles can be improved.

Moreover, according to the present embodiment, application of the falling waveform portion is performed at such timing that the microparticle reaches the communication port 156 for the main flow path 15 at the separation flow path 16, and the negative pressure can act at the timing most suitable for the target particle. Thus, the target microparticle can be efficiently and properly extracted into the pressure chamber 161 (the region).

Further, according to the present embodiment, application of the rising waveform portion is performed in a stepwise manner, and therefore, only the liquid can be discharged without discharging, from the pressure chamber, the microparticles extracted once.

5. Example 5-1. Analysis of Re-Emission of Microparticles

In the basic microparticle separation method using the microparticle separation microchip as described above, the microparticles can be continuously separated and extracted into the pressure chamber without abort processing.

In the basic microparticle separation method, after the microparticles have been continuously separated, the actuator (also referred to as the piezo element) needs to be returned to an initial position so that the microparticles can be separated again. Upon actual execution of this method, it has been observed that the liquid separated together with the microparticles is discharged from the pressure chamber with high voltage when the piezo element returns to the initial position, and re-emission of the separated microparticles occurs.

For this reason, it is assumed that the behavior of discharging from the pressure chamber after acquisition of the microparticles is controlled so that re-emission of the separated microparticles can be reduced.

Moreover, as a result of observation of the flow of liquid, it has been found that a liquid response delays with respect to the drive waveform of the piezo element.

For this reason, as long as the microparticles flow at regular intervals, the microparticles can be separated with constant voltage because the liquid delays with respect to the drive waveform.

The basic microparticle separation method of the present technology as described above is performed with an input waveform in piezo element drive as illustrated in FIG. 18. In the case of using the input as A in FIG. 18, the rising waveform is continuously made without taking multiple steps as in an input waveform illustrated in FIG. 19. In the case of performing a microparticle separation experiment at 1500 eps, a recovery rate was 64.5%.

On the other hand, in the case of using an input waveform having a flat portion after a rising waveform as B in FIG. 18, the flat portion is temporarily present after the first rising, and the second rising is made, as illustrated in FIG. 20. Thus, in the case of performing the microparticle separation experiment at 1500 eps, it has been found that the recovery rate can be maintained at 100%.

For these reasons, in the present technology, the drive waveform of the piezo element does not rise within a certain time (hereinafter sometimes referred to as "Th2" (unit: μs)) after rising, and re-rises after the Th2.

Regarding the behavior of the microparticle at the branched portion of the separation flow path of the microparticle separation microchip, a case where the microparticle is acquired with two types of piezo element drive waveforms was analyzed by simulation. An analysis example is illustrated in FIG. 21.

A to C in FIG. 21 illustrate an example where the Th2 (the certain time after rising) is 10 μs, and D and E in FIG. 21 illustrate an example where the Th2 is 50 μs. Arrows indicate the flow.

Moreover, A and D in FIG. 21 illustrate a microparticle state after a lapse of 70 μs after piezo element drive, B and E in FIG. 21 illustrate a microparticle state after a lapse of 260 μs after piezo element drive, and C and F in FIG. 21 illustrate a microparticle state after a lapse of 660 μs after piezo element drive.

As illustrated in C in FIG. 21, when Th2=10 μs is satisfied and 660 μs is lapsed after piezo element drive, it has been found that several microparticles are present in the vicinity of the orifice and the particles have flowed backward. Thus, re-emission of the microparticles could have occurred. On the other hand, in the case of Th2=50 μs in D and E in FIG. 21, it has been confirmed that no microparticles are present in the vicinity of the orifice and no re-emission of the microparticles occurs. Thus, the certain time after rising is, for example, preferably 50 μs, and the inner pressure of the pressure chamber is held for 50 μs.

Note that analysis conditions were a sheath liquid of 1 ml/min, a gate flow of 150 μm/min, and a separation flow of 120 μm/min, and the piezo element was driven under such conditions that the discharging operation is executed three times after the microparticle separation operation has been performed once.

Moreover, FIG. 22 illustrates a relationship between the Th2 and an orifice inner flow velocity.

FIG. 22 shows that when the Th2 is set short, the flow velocity upon discharging is high, and a condition where the separated microparticles are easily re-emitted is easily brought. It was assumed that this phenomenon is due to a delay in pressure fluctuation in the pressure chamber with respect to the drive waveform of the piezo element.

5-2. Study on Separation of Microparticles with Low Voltage

In the basic microparticle separation method described above, specifications are employed, in which the separation operation is continuously performed when the microparticles close to each other arrive.

However, the negative pressure has been actually already brought upon holding after a rising time (hereinafter sometimes referred to as "Tf" (unit: μs)) of 10 μs, and therefore, it is assumed that the microparticles can be separated by separation operation weaker than normal operation during this period.

FIG. 23 illustrates a relationship between a time elapsed after piezo element drive and a microparticle distance from an orifice inlet.

A state in which the microparticles are extracted in the case of executing separation of the microparticles with drive waveforms cos 5-5-10, cos 10-5-10 was observed by a high-speed camera.

As illustrated in FIG. 23, it has been found that the microparticles are extracted into the orifice until around 25 μs after piezo element drive and extracting of the liquid is maintained.

Thus, it was assumed that for separation of the microparticles close to each other, drive control is preferably performed according to a function using a time (hereinafter sometimes referred to as "Tp" (unit: μs)) between the microparticles as a factor. That is, the separation and discharging operation is scaled down in an amplitude/time direction with a Tp-dependent scale α (the above-describe coefficient α).

According to one example embodiment, a drive control voltage for the actuator to collect the microparticles is determined as a function of a variable α which can be varied as a function of a number of the microparticle in the sequence of microparticles. In this example, the drive control voltage used to generate each change in negative pressure within the pressure chamber is determined as $\alpha_n V_p$, where n is the number of the microparticle being extracted, Vp is the drive control voltage generating a negative pressure for a standard amount, such as the amount of negative pressure for extracting the first particle, and α is a function defined according to the following relationship:

If Tp<Tmax
then $\alpha_n = 1-k(Tmax-Tp)/Tmax$
whereas if Tmax<Tp
then $\alpha_n = 1$ According to the above relationship the maximum two-microparticle spacing (Tmax) and k to which amplitude control is applied can be freely selected as input parameters.

Examples of setting parameters usable by the present technology are shown in Table 1 below, and FIG. 24 illustrates a relationship between examples of default settings of the parameters used in the present technology and the drive waveform of the piezo element.

TABLE 1

| Parameters | Symbols |
| --- | --- |
| Spacing between two continuous particles | Tp |
| Time until PZT drive start time after detection | Tdelay |
| Two-particle spacing allowing execution of rising | Tset |
| Maximum two-particle spacing to which amplitude control is applied | Tmax |
| Coefficient for controlling falling amplitude (Tp < Tmax) | k1 |
| Coefficient for controlling rising amplitude (Tp < Tmax) | k2 |
| Falling waveform contraction rate | α |
| Rising waveform contraction rate | β |

* Tdelay > Tset needs to be set.

FIG. 24 provides an illustration of the drive control waveform of FIG. 16 for an example in which two successive microparticles MPa, MPb are captured. As shown in FIG. 24, as a first fall in the voltage producing a negative pressure the drive control voltage is reduced by a voltage Vp from time 0 from a reference voltage Vr within a fall time Tf. As explained above, in order to ensure that the first microparticle MP1 is retained within the pressure chamber, the drive control voltage is held at the voltage Vr−Vp for a hold time Thb. In order to capture the second microparticle MP2 the control voltage is then reduced by a further amount of Vp, from the voltage Vr−Vp to a voltage Vr−2Vp over a fall time Tfb. The drive control voltage is then held at the value Vr−2Vp for a hold time Th1 to ensure that both particles MPa, MPb are held in the pressure chamber and do not inadvertently egress from the pressure chamber.

As explained above, the drive control voltage should be returned to the reference or neutral value, whenever possible in order to "reset" the system to provide maximum negative pressure fall to capture the next microparticle or microparticles. Accordingly, after a hold time of Th1, to ensure that the two microparticles MPa, MPb flow through the pressure chamber and into the purified sample, the drive voltage is raised by a first step of Vp in a rise time of Tr and then held by a hold time Th2, again to ensure that there is no back flow from the pressure chamber. After the hold time Th2, and without the presence of a microparticle to be captured, the drive control voltage is raised again within a rise time Trb by and amount Vp to return the drive control voltage to the reference voltage Vr.

As can be understood from the drive control voltage waveform shown in FIG. 21, a total time required to return the drive control voltage to the reference voltage V0 for any particle, which is designated as Tset, can be determined from Table 1 and FIG. 24 as:

$$Tset = Tf + Th1 + Tr + Th3$$

Tset therefore also represents a temporal spacing between two microparticles which allows the system to execute a rise in the drive control voltage. Moreover, embodiments of the present technology can provide an arrangement in which the fall of the drive control voltage and the rise in the drive control voltage is dynamically control depending on the number of a microparticle in a sequence of microparticles using each of the parameters α, β shown in Table 1, which may be represented by:

$$\alpha = 1 - k1 |T\max - Tp|/T\max$$

$$\beta = 1 - k2 |T\max - Tp|/T\max$$

According to some embodiments, the positive pressure in the pressure chamber for an m-th increase in positive pressure after an increase in the negative pressure is $\beta_m Vp$, and if a time between the last microparticle extracted and the next microparticle (Tp) is greater than a total of a time for the negative pressure to fall and a hold time for the absolute pressure to prevent the extracted microparticle to flow back into the main path is less than a settling time, then the scaling factor $\beta_m = 1$, else $\beta_m = 1 - kb(Tmax - Tp)/Tmax$.

Moreover, FIGS. 25A and 25B show the drive waveform of the piezo element in the case of Tp<Tf (the separation operation is stopped in the middle, and drive is performed once to make the falling) and the drive waveform of the piezo element in the case of Tf<Tp (drive is performed twice in succession with the same voltage to make the falling in two steps) in the basic microparticle separation method of the present technology. The falling is continuously made in the case of Tp<Tf, but in the case of Tf<Tp, piezo element is driven to make the falling in two or more steps with the same voltage.

In the microparticle separation method of an embodiment of the present technology as described herein, the first reading is made with three types of parameters (A, B, C) illustrated in FIG. 26. That is, suction operation (A) corresponds to falling drive described above, and the discharging operation (B) corresponds to rising drive. The parameters are set such that a holding time (C) is ensured between multiple suction operations, between multiple discharging operations, and between the suction operation and the discharging operation.

Moreover, FIG. 27 illustrates pattern examples a to d of the Tp-dependent piezo element drive waveform.

The pattern a shows a pattern in which the second step of the falling drive is performed with low voltage in the case of a short Tp.

The pattern b shows a pattern in which the second step of the falling drive is normally performed in the case of a long Tp.

The pattern c shows a pattern in which a certain time is held after the falling drive, the rising drive is normally performed, and subsequent falling drive is performed with high voltage.

The pattern d shows a pattern in which a certain time is held after the falling drive, the rising drive is normally performed, and subsequent falling drive is normally performed.

In the present technology, it is controlled such that separation of the microparticles and discharging from the pressure chamber based on voltage application to the piezo element are, as necessary, performing by drive of the piezo element with the waveforms a to d of FIG. 27.

In the case of performing the second step of the falling drive with low voltage as shown in the pattern a of FIG. 27 as described above, study has been conducted on the microparticle spacing with which the microparticles can be separated with low voltage.

Study has been conducted on the recovery rate in a case where the microparticle separation microchip was used to input the piezo element drive waveform illustrated in FIG. 28 to separate the microparticles by means of second drive (separation drive at the second step) in the figure.

In this case, Tf illustrated in FIG. 28 was set to 10 μs, Th1 was set to 5 μs, Tr was set to 10 μs, Vp was 27 V, and Tp was 20 μs.

A relationship between α as described above and the recovery rate under these conditions is illustrated in FIG. 29.

FIG. 29 shows that in a case where Tp is 20 μs, i.e., the microparticle arrives at an interval of 20 μs, if α=0.1 and the piezo element is driven with at least 2.7 V or higher, separation can be performed. Moreover, assuming that the microparticles continuously arrive at an interval of 40 μs, the recovery rate in the case of the second drive with α=0.2 (5.4 V) was 100%.

As described above, regarding the most suitable value for separation of the microparticles, adjustment might need to be performed for each microparticle separation microchip. However, regarding the second drive of FIG. 28, it was shown that separation can be performed with lower voltage than that of first drive (separation drive at the first step).

This second drive can be determined depending on the microparticle spacing, and a can be provided as, e.g., a function defined as follows. Tmax, Tstable, and k as described below can be freely selected as the input parameters. Moreover, V0 as described below shows an initial piezo element drive voltage.

According to this example embodiment;
If Tp<Tmax then $\alpha = 1 - k(T\max - Tp)/T\max$ and Vp=αV0
Else if Tmax<Tp<Tstable then $\alpha = 1 + k(Tp - T\max)/T\max$ and Vp=αV0
Else if Tstable<Tp
then α=1
and Vp=V0

Where Tstable is a time required to capture a microparticle and return the system to the reference voltage V0. Tstable differs from Tset, which is a time between particles Tp which can allow the system to increase the drive control voltage, whereas Tstable is a time for the system to return the drive control voltage after capturing a microparticle to the reference voltage V0.

5-3. Comparison Between Basic Microparticle Separation Method and Microparticle Separation Method of Present Technology Actually, the above-described drive technique for separation with the low voltage was implemented, and a difference between the above-described basic microparticle separation method and the microparticle separation method of an embodiment of the present technology was obtained by comparison of Electronic or Digital Aborts (DA aborts). As will be appreciated by those acquainted with cytometry, DA aborts refers to a measure of how often (or less often) a cell sorting was aborted due to system constraints or delay in processing or too many close-by cells in the fluid, etc. Accordingly, for N target particles, when n times of piezo drive is applied (successful extraction), then Digital Abort= (N−n)/N.

Using the microparticle separation microchip, the DA aborts at respective event rates were compared by analysis of a log file.

Results (experimental values) of comparison between the DA abort in a case where Tf/Tr was 10 μs, Th1 was 5 μs, the voltage was 27 V, and k=0 and the DA abort in a case where k=1 and Tmax was 100 μs are shown in FIG. 30. Moreover, results (Sim) of calculation by simulation are also shown in FIG. 30.

As seen from FIG. 30, not only the simulation results show that the DA abort that occurs at high event can be significantly reduced by means of the technique of the microparticle separation method of an embodiment of the present technology, but also the experimental values show that the DA abort can be further reduced.

5-4. Comparison of Recovery Rates

Using the microparticle separation microchip, the DA aborts at respective event rates were compared by analysis of the log file.

In this case, a sheath flow rate was set to 10 ml/min, a gate flow rate was set to 100 to 110 μl/min, and a flow rate not targeted for separation was set to 100 μl/min to 110 μm/min. Moreover, regarding the piezo element drive waveform, Tf/Tr was set to 10 μs, Th1 was set to 5 μs, Th2 was set to 5 μs, and Th3 was set to 10 μs. In the microparticle separation method of an embodiment of the present technology, k1=1, k2=0, and Tmax=100 were set.

DA abort comparison results between the basic microparticle separation method and the microparticle separation method of an embodiment of the present technology are shown in FIG. 31, and recovery rate comparison results are shown in FIG. 32.

As in the results obtained in FIG. 30, the microparticle separation method of an embodiment of the present technology shows lower DA abort values as compared to those of the basic microparticle separation method as illustrated in FIG. 31.

Moreover, FIG. 32 shows that when the number of times of detection of the microparticle per second (the event rate) is 10000 to 15000 eps, the recovery rate is about 70% in the basic microparticle separation method, whereas the recovery rate in the microparticle separation method of an embodiment of the present technology is about 100%. This is because of an assumption that in the basic microparticle separation method, the separation operation and the discharging operation are performed with high voltage and re-emission of the microparticles occurs.

On the other hand, in the microparticle separation method of an embodiment of the present technology, when the event rate reaches about 20000 eps, tendency shows that the recovery rate decreases. This might suggest a probability that continuous separation performance is lowered and microparticle re-emission occurs due to influence of discharging upon returning of the piezo element voltage.

However, regarding this probability, the piezo element drive voltage is calculated using the spacing between adjacent microparticles in the microparticle separation method of an embodiment of the present technology. Thus, when the microparticles continuously arrive at, e.g., an interval of equal to or shorter than 35 μs, separation of the microparticles is continuously executed with extremely-low voltage as illustrated in FIG. 33. The microparticle separation method of an embodiment of the present technology utilizes time taken until the inner pressure of the pressure chamber returns to that in a steady state. For this reason, unless the separation operation is performed again with a certain level of drive force or higher after the lapse of the certain time, the inside of the pressure chamber is not brought into the negative pressure. That is, in the case of the behavior as in FIG. 33, it is assumed that there is a probability that the microparticles can be no longer separated with low voltage after the lapse of the certain time.

For this reason, it is preferred that Tmax is, after execution of microparticle separation with α=1, changed such that separation is executed again under a condition of α=1 after the lapse of the certain time as illustrated in FIG. 34.

5-5. Relationship Between Variation in Piezo Element and Microparticle Separation Speed Assuming that the piezo element is a consumable element, it is considered that microparticle separation characteristics vary according to variation in the piezo element itself. For this reason, study has been conducted on influence of variation in the piezo element on the separation characteristics.

The maximum displacement of the piezo element was provided as a parameter to perform Monte Carlo simulation, and an abort rate in the case of executing microparticle separation at each event rate was calculated. Variation in the maximum displacement of the piezo element was set to 4.6 μm±1.5 μm with reference to catalogue values.

Results of analysis of the DA abort at the event rate for different maximum displacements of the piezo element are shown in FIG. 35.

FIG. 35 shows that with the piezo element drive waveform of the microparticle separation method of an embodiment of the present technology, the piezo element of any displacement exhibits the DA abort <5% and a characteristic variation of equal to or lower than 1% at 20000 eps.

Thus, it has been determined that almost no influence of variation in the piezo element is on the microparticle separation characteristics.

Note that the present technology may employ the following configurations.

[1] A microparticle separation method using a microparticle separation microchip including a main flow path in which a microparticle flows and a pressure chamber communicating with the main flow path, including:

generating negative pressure in the pressure chamber communicating with the main flow path to separate and fetch the microparticle in liquid flowing in the main flow path into the pressure chamber; and generating positive pressure equal to or lower than a total absolute value of the negative pressure generated in the pressure chamber to discharge the liquid from the pressure chamber to the main flow path, in which the negative pressure or the positive pressure is controlled by a time interval of detection of the microparticle in the liquid flowing in the main flow path.

[2] The microparticle separation method according to [1], further including:

after the generating the negative pressure in the pressure chamber communicating with the main flow path to separate and fetch the microparticle in the liquid flowing in the main flow path into the pressure chamber, holding an inner pressure of the pressure chamber for a certain time, and generating, in a case where the certain time is equal to or shorter than a predetermined value, further negative pressure in the pressure chamber to separate and fetch a subsequent microparticle in the liquid flowing in the main flow path into the pressure chamber.

[3] The microparticle separation method according to [2], in which the further negative pressure is controlled by an interval between a time at which the microparticle in the liquid flowing in the main flow path has been detected and a time at which the subsequent microparticle in the liquid flowing in the main flow path has been detected.

[4] The microparticle separation method according to [3], in which the further negative pressure is equal to or lower than the negative pressure.

[5] The microparticle separation method according to any of [1] to [4], in which at the steps, a procedure is performed in which a force of deforming an inner space of the pressure chamber is applied from an actuator to generate the negative pressure or the positive pressure, and to increase or decrease a volume of the inner space.

[6] The microparticle separation method according to [5], in which at the procedure, a drive waveform including a pulse waveform, a step waveform, or an undershoot-containing step waveform is applied to the actuator.

[7] The microparticle separation method according to [6], in which application of the pulse waveform is separately controlled for a falling waveform portion and a rising waveform portion.

[8] The microparticle separation method according to [7], in which a voltage of the falling waveform portion is controlled by the time interval of detection of the microparticle in the liquid flowing in the main flow path.

[9] The microparticle separation method according to [8], in which the voltage of the falling waveform portion is controlled to equal to or lower than a maximum voltage in a case where an interval between a time at which the microparticle in the liquid flowing in the main flow path has been detected and a time at which the subsequent microparticle in the liquid flowing in the main flow path has been detected is equal to or shorter than a predetermined value.

[10] The microparticle separation method according to [8] or [9], in which the falling waveform portion is controlled such that the maximum voltage is applied again after a lapse of a certain time from application of the maximum voltage.

[11] The microparticle separation method according to any of [1] to [10], further including:

after the generating the negative pressure in the pressure chamber communicating with the main flow path to separate and fetch the microparticle in the liquid flowing in the main flow path into the pressure chamber, holding an inner pressure of the pressure chamber for a certain time, and generating, in a case where the certain time is equal to or longer than a predetermined value, positive pressure lower than the total absolute value of the negative pressure generated in the pressure chamber to discharge the liquid from the pressure chamber to the main flow path.

[12] The microparticle separation method according to any of [1] to [11], further including:

after the generating the positive pressure equal to or lower than the total absolute value of the negative pressure generated in the pressure chamber to discharge the liquid from the pressure chamber to the main flow path, holding an inner pressure of the pressure chamber for a period equal to or longer than 50 µs.

[13] The microparticle separation method according to [12], further including:

after the holding the inner pressure of the pressure chamber for a period equal to or longer than 50 µs, generating further positive pressure in the pressure chamber to discharge further liquid from the pressure chamber to the main flow path.

[14] The microparticle separation method according to [13], in which at the generating the further positive pressure in the pressure chamber to discharge the further liquid from the pressure chamber to the main flow path, the further positive pressure is positive pressure within a difference range between the total absolute value of the negative pressure and the positive pressure.

[15] A microparticle separation program for causing a computer to execute, in a microparticle separation microchip including a main flow path in which a microparticle flows and a pressure chamber communicating with the main flow path, generating negative pressure in the pressure chamber communicating with the main flow path to separate and fetch the microparticle in liquid flowing in the main flow path into the pressure chamber, generating positive pressure equal to or lower than a total absolute value of the negative pressure generated in the pressure chamber to discharge the liquid from the pressure chamber to the main flow path, and controlling the negative pressure or the positive pressure by a time interval of detection of the microparticle in the liquid flowing in the main flow path.

[16] A microparticle separation system including:

a microparticle separation microchip including a main flow path in which a microparticle flows and a pressure chamber communicating with the main flow path;

a microchip mounting portion on which the microparticle separation microchip is mounted;

a light irradiator configured to irradiate, with light, a microparticle detection region included in the main flow path;

a detector configured to detect scattered light and/or fluorescence emitted from the microparticle; and a pressure chamber controller configured to bring an inside of the pressure chamber into negative pressure or positive pressure, in which the pressure chamber controller is controlled by a microparticle separation program for causing a computer to execute generating the negative pressure in the pressure chamber communicating with the main flow path to separate and fetch the microparticle in liquid flowing in the main flow path into the pressure chamber, generating the positive pressure equal to or lower than a total absolute value of the negative pressure generated in the pressure chamber to discharge the liquid from the pressure chamber to the main flow path, and controlling the negative pressure or the positive pressure by a time interval of detection of the microparticle in the liquid flowing in the main flow path.

Note that the present technology may employ the following configurations.

Embodiments of the present can provide a method of separating microparticles in which a microparticle separation microchip is used, which includes a main flow path in which the microparticles flow in a sheath liquid and a pressure chamber communicating with the main flow path. The method comprises detecting each of a plurality of microparticles in a sequence of the microparticles for extraction in the sheath liquid in the main flow path and generating for each of the plurality of microparticles of the sequence of microparticles a change in a negative pressure in the pressure chamber communicating with the main flow path to extract each of the detected microparticles in sheath liquid flowing in the main flow path into the pressure chamber. The generating the change of the negative pressure to extract each of the plurality of microparticles in the sequence of microparticles comprises changing the negative pressure by a different amount in accordance with a separation between the microparticle being extracted and a next of the microparticles in the sequence of microparticles, to extract each microparticle in the sequence of microparticles.

Embodiments of the present invention can also provide a microparticle separation method using a microparticle separation microchip including a main flow path in which a microparticle flows and a pressure chamber communicating with the main flow path, including:
generating negative pressure in the pressure chamber communicating with the main flow path to separate and fetch the microparticle in liquid flowing in the main flow path into the pressure chamber; and
generating positive pressure equal to or lower than a total absolute value of the negative pressure generated in the pressure chamber to discharge the liquid from the pressure chamber to the main flow path,
in which the negative pressure or the positive pressure is controlled by a time interval of detection of the microparticle in the liquid flowing in the main flow path.

The following numbered paragraphs provide further example embodiments:

Paragraph 1. A method of extracting microparticles, the method comprising detecting target microparticles for extraction in a main flow path which communicates with a pressure chamber,
generating for each of the detected target microparticles a change in a negative pressure in the pressure chamber communicating with the main flow path to separate and extract each of the detected target microparticles flowing in the main flow path into the pressure chamber, wherein the generating the change of the negative pressure to extract the detected target microparticles comprises
generating a negative change in pressure by a different amount in accordance with a separation between the detected target microparticles.

Paragraph 2. The method of paragraph 1, wherein the separation of the detected target microparticles is a separation in time determined with respect to a flow rate, and the generating the negative pressure by the different amount in accordance with the separation between the detected target microparticles being extracted comprises determining scaling factors based on a separation time between the target microparticles being extracted compared with a preset maximum time (Tmax), and applying the scaling factors to change the negative pressure by the different amount for the target microparticles being extracted.

Paragraph 3. The method of paragraph 2, wherein the negative pressure in the pressure chamber is produced by an actuator under control of a drive control voltage, the change in the negative pressure being generated by a change in the drive control voltage, and the change in the drive control voltage for the detected target microparticles being extracted is set to a predetermined value (Vp) scaled by a scaling factor ($\alpha$).

Paragraph 4. The method of paragraph 3, wherein the negative pressure in the pressure chamber for the n-th detected target microparticle being extracted is $\alpha_n Vp$, and if the separation between the microparticles being extracted (Tp) is less than the preset maximum time between the detected target microparticles then the scaling factor for the n-th microparticle $\alpha_n = 1 - k(Tmax - Tp)/Tmax$, whereas if a separation between the detected target microparticles being extracted is greater than the preset maximum time between microparticles then the scaling factor for the n-th microparticle $\alpha_n = 1$.

Paragraph 5. The method of any of paragraphs 1 to 4, comprising
generating a positive pressure in the pressure chamber for a predetermined hold time set to ensure that the microparticle being extracted does not flow back into the main flow path.

Paragraph 6. The method of paragraph 5, the generating the positive pressure comprises
generating the positive change in pressure in the pressure chamber after at least one of the generated changes in the negative pressure by the different amounts to extract the detected target microparticles, the positive change in pressure in the pressure chamber being determined by an amount by which the negative pressure was changed and a time to a next one of the detected target microparticles to be extracted.

Paragraph 7. The method of paragraph 6, wherein the generating the positive change in pressure in the pressure chamber comprises
changing the positive pressure in one or more steps by an amount determined by an absolute negative pressure in the pressure chamber, a time between the last detected target microparticle and a next of the detected target microparticles to be extracted.

Paragraph 8. The method of any of paragraphs 5 to 7, wherein the generated change in the pressure in the pressure chamber is produced by an actuator under control of a drive control voltage, the change in the positive pressure being generated by a change in the drive control voltage, and the change in the drive control voltage is set to a predetermined value (Vp) scaled by a scaling factor ($\beta$).

Paragraph 9. The method of paragraph 8, wherein if the time since the last of the detected target microparticles was extracted to the time to the next of the detected target microparticles to be extracted is greater than a predetermined settling time then the positive pressure change is generated by controlling the increase in pressure with an increase in the drive control voltage of $\beta Vp$, where $\beta = 1$.

Paragraph 10. The method of paragraph 9, wherein after an m-th increase in the pressure in the pressure chamber by the drive control voltage of $\beta_m Vp$, the method comprises increasing the negative pressure by a drive control voltage of $\alpha_n Vp$ to capture one of the detected target microparticles in the sequence wherein $\alpha_n > \beta_m$.

Paragraph 11. The method of paragraph 10, wherein $\beta_m=1$, and the negative pressure is increased by an amount $\alpha_n Vp$, where $\alpha_n>1$.

Paragraph 12. The method of any paragraphs 8 to 11, wherein the generating the positive pressure for the predetermined hold time includes generating the positive pressure in the pressure chamber for an m-th amount by changing the drive control voltage by $\beta_m Vp$, and if a time between the last of the detected target microparticles extracted and the next of the detected target microparticles (Tp) is greater than a total of a time to generate the change in the negative pressure to extracted the last detected target microparticle and a hold time for the absolute pressure to prevent the last extracted detected target microparticle to flow back into the main path, then the scaling factor $\beta_m=1$, else $\beta_m=1-kb(Tmax-Tp)/Tmax$, where Tmax is the preset maximum time and kb is a constant scaling factor.

Paragraph 13. The method of any of paragraphs 1 to 12, wherein the next target microparticle is a subsequent microparticle in the sequence of microparticles to the target microparticles, or the next target microparticle is a target microparticle for which there is no microparticle between the target microparticle and the next target microparticle.

Paragraph 14. The method of any of paragraphs 1 to 13, wherein the target microparticles are flowing in a sheath liquid.

Paragraph 15. The method of paragraph 2, wherein the target microparticles and flowing in a sheath liquid and the flow rate is a flow rate of the sheath liquid.

Paragraph 16. The method of any of paragraphs 1 to 15, wherein the main flow path and the pressure chamber are formed in a microparticle separation chip.

Paragraph 17. A system comprising
a microparticle separation chip which includes a main flow path which communicates with a pressure chamber,
detector circuitry configured to detect microparticles in the main flow path,
an actuator operatively disposed with respect to the microparticle separation chip to generate a change in pressure in the pressure chamber in response to a drive control voltage, and
driver circuitry configured to receive a signal from the detector circuitry detecting target microparticles in the main flow path and to control the drive control voltage of the actuator
to generate for each of the detected target microparticles a change in a negative pressure in the pressure chamber communicating with the main flow path to separate and extract each of the detected target microparticles flowing in the main flow path into the pressure chamber, wherein the change of the negative pressure is generated to extract the detected target microparticles by generating a negative change in the pressure by a different amount in accordance with a separation between the detected target microparticles.

Paragraph 18. The system of paragraph 17, wherein the separation of the detected target microparticles is a separation in time determined with respect to a flow rate, and the driver circuitry is configured to generate the negative pressure by the different amount in accordance with the separation between the detected target microparticles being extracted by
determining scaling factors based on a separation time between the target microparticles being extracted compared with a preset maximum time (Tmax), and applying the scaling factors to change the negative pressure by the different amount for the target microparticles being extracted.

Paragraph 19. The system of paragraph 18, wherein the change in the drive control voltage for the detected target microparticles being extracted is set to a predetermined value (Vp) scaled by a scaling factor ($\alpha$), and the driver circuitry is configured to generate the negative pressure in the pressure chamber for the n-th detected target microparticle being extracted by using a drive control voltage $\alpha_n Vp$, and if the separation between the microparticles being extracted (Tp) is less than the preset maximum time between the detected target microparticles then the scaling factor for the n-th microparticle $\alpha_n=1-k(Tmax-Tp)/Tmax$, whereas if a separation between the detected target microparticles being extracted is greater than the preset maximum time between microparticles then the scaling factor for the n-th microparticle $\alpha_n=1$.

Paragraph 20. The system of any of paragraphs 17 to 19, wherein the driver circuitry is configured to generate a positive pressure in the pressure chamber for a predetermined hold time set to ensure that the microparticle being extracted does not flow back into the main flow path.

Paragraph 21. A computer program storage medium having stored on the storage medium program code which when executed by a computer causes the computer to perform the method according to any of paragraphs 1 to 15.

Paragraph 22. A computer program which when executed by a computer causes the computer to perform the method according to any of paragraphs 1 to 15.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

A Microparticle separation device
S Sample liquid laminar flow
T Sheath liquid laminar flow
1a, 1b Microchip
11 Sample liquid inlet
12 Sample liquid flow path
13 Sheath liquid inlet
14 Sheath liquid flow path
15 Main flow path
15a Detection region
156 Communication port
16 Separation flow path
161, 164 Pressure chamber
162 Intake port
163 Trapping chamber
17 Disposal flow path
21 Irradiator
22 Detector
23 Driver
31 Actuator
311 Displacement plate

The invention claimed is:

1. A method of extracting microparticles, the method comprising detecting target microparticles for extraction in a main flow path which communicates with a pressure chamber,
generating for each of the detected target microparticles a change in a negative pressure in the pressure chamber communicating with the main flow path to separate and extract each of the detected target microparticles flowing in the main flow path into the pressure chamber, wherein the generating the change of the negative pressure to extract the detected target microparticles comprises generating a negative change in pressure by a different amount in accordance with a separation between the detected target microparticles.

2. The method of claim 1, wherein the separation of the detected target microparticles is a separation in time determined with respect to a flow rate, and the generating the negative pressure by the different amount in accordance with the separation between the detected target microparticles being extracted comprises determining scaling factors based on a separation time between the target microparticles being extracted compared with a preset maximum time (Tmax), and applying the scaling factors to change the negative pressure by the different amount for the target microparticles being extracted.

3. The method of claim 2, wherein the negative pressure in the pressure chamber is produced by an actuator under control of a drive control voltage, the change in the negative pressure being generated by a change in the drive control voltage, and the change in the drive control voltage for the detected target microparticles being extracted is set to a predetermined value (Vp) scaled by a scaling factor ($\alpha$).

4. The method of claim 3, wherein the negative pressure in the pressure chamber for the n-th detected target microparticle being extracted is $\alpha_n$ Vp, and if the separation between the microparticles being extracted (Tp) is less than the preset maximum time between the detected target microparticles then the scaling factor for the n-th microparticle $\alpha_n = 1 - k(Tmax - Tp)/Tmax$, whereas if a separation between the detected target microparticles being extracted is greater than the preset maximum time between microparticles then the scaling factor for the n-th microparticle $\alpha_n = 1$.

5. The method of claim 1, comprising generating a positive pressure in the pressure chamber for a predetermined hold time set to ensure that the microparticle being extracted does not flow back into the main flow path.

6. The method of claim 5, the generating the positive pressure comprises generating the positive change in pressure in the pressure chamber after at least one of the generated changes in the negative pressure by the different amounts to extract the detected target microparticles, the positive change in pressure in the pressure chamber being determined by an amount by which the negative pressure was changed and a time to a next one of the detected target microparticles to be extracted.

7. The method of claim 6, wherein the generating the positive change in pressure in the pressure chamber comprises changing the positive pressure in one or more steps by an amount determined by an absolute negative pressure in the pressure chamber, a time between the last detected target microparticle and a next of the detected target microparticles to be extracted.

8. The method of claim 5, wherein the generated change in the pressure in the pressure chamber is produced by an actuator under control of a drive control voltage, the change in the positive pressure being generated by a change in the drive control voltage, and the change in the drive control voltage is set to a predetermined value (Vp) scaled by a scaling factor ($\beta$).

9. The method of claim 8, wherein if the time since the last of the detected target microparticles was extracted to the time to the next of the detected target microparticles to be extracted is greater than a predetermined settling time then the positive pressure change is generated by controlling the increase in pressure with an increase in the drive control voltage of $\beta$Vp, where $\beta = 1$.

10. The method of claim 9, wherein after an m-th increase in the pressure in the pressure chamber by the drive control voltage of $\beta_m$Vp, the method comprises increasing the negative pressure by a drive control voltage of $\alpha_n$Vp to capture one of the detected target microparticles in the sequence wherein $\alpha_n > \beta_m$.

11. The method of claim 10, wherein $\beta_m = 1$, and the negative pressure is increased by an amount $\alpha_n$Vp, where $\alpha_n > 1$.

12. The method of claim 8, wherein the generating the positive pressure for the predetermined hold time includes generating the positive pressure in the pressure chamber for an m-th amount by changing the drive control voltage by $\beta_m$Vp, and if a time between the last of the detected target microparticles extracted and the next of the detected target microparticles (Tp) is greater than a total of a time to generate the change in the negative pressure to extracted the last detected target microparticle and a hold time for the absolute pressure to prevent the last extracted detected target microparticle to flow back into the main path, then the scaling factor $\beta_m = 1$, else $\beta_m = 1 - kb(Tmax - Tp)/Tmax$, where Tmax is the preset maximum time and kb is a constant scaling factor.

13. The method of claim 1, wherein the next target microparticle is a subsequent microparticle in the sequence of microparticles to the target microparticles, or the next target microparticle is a target microparticle for which there is no microparticle between the target microparticle and the next target microparticle.

14. The method of claim 1, wherein the target microparticles are flowing in a sheath liquid.

15. The method of claim 2, wherein the target microparticles and flowing in a sheath liquid and the flow rate is a flow rate of the sheath liquid.

16. The method of claim 1, wherein the main flow path and the pressure chamber are formed in a microparticle separation chip.

17. A system comprising a microparticle separation chip which includes a main flow path which communicates with a pressure chamber, detector circuitry configured to detect microparticles in the main flow path, an actuator operatively disposed with respect to the microparticle separation chip to generate a change in pressure in the pressure chamber in response to a drive control voltage, and driver circuitry configured to receive a signal from the detector circuitry detecting target microparticles in the main flow path and to control the drive control voltage of the actuator to generate for each of the detected target microparticles a change in a negative pressure in the pressure chamber communicating with the main flow path to separate and extract each of the detected target microparticles flowing in the main flow path into the pressure chamber, wherein the change of the negative pressure is generated to extract the detected target microparticles by generating a negative change in the pressure by a different amount in accordance with a separation between the detected target microparticles.

18. The system of claim 17, wherein the separation of the detected target microparticles is a separation in time determined with respect to a flow rate, and the driver circuitry is configured to generate the negative pressure by the different amount in accordance with the separation between the detected target microparticles being extracted by determining scaling factors based on a separation time between the target microparticles being extracted compared with a preset maximum time (Tmax), and applying the scaling factors to change the negative pressure by the different amount for the target microparticles being extracted.

19. The system of claim 18, wherein the change in the drive control voltage for the detected target microparticles being extracted is set to a predetermined value (Vp) scaled by a scaling factor ($\alpha$), and the driver circuitry is configured to generate the negative pressure in the pressure chamber for the n-th detected target microparticle being extracted by using a drive control voltage $\alpha_n Vp$, and if the separation between the microparticles being extracted (Tp) is less than the preset maximum time between the detected target microparticles then the scaling factor for the n-th microparticle $\alpha_n = 1 - K(Tmax - Tp)/Tmax$, whereas if a separation between the detected target microparticles being extracted is greater than the preset maximum time between microparticles then the scaling factor for the n-th microparticle $\alpha_n = 1$.

20. A computer program storage medium having stored on the storage medium program code which when executed by a computer causes the computer to perform the method according to claim 1.

* * * * *